US012784401B2

(12) United States Patent
Yano

(10) Patent No.: US 12,784,401 B2
(45) Date of Patent: Nov. 3, 2026

(54) IMAGE PROCESSING APPARATUS, IMAGE PROCESSING METHOD, AND NON-TRANSITORY COMPUTER READABLE MEDIUM

(71) Applicant: CANON KABUSHIKI KAISHA, Tokyo (JP)

(72) Inventor: Yukiteru Yano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 129 days.

(21) Appl. No.: 18/909,449

(22) Filed: Oct. 8, 2024

(65) Prior Publication Data

US 2025/0124618 A1 Apr. 17, 2025

(30) Foreign Application Priority Data

Oct. 16, 2023 (JP) ................................ 2023-178225

(51) Int. Cl.

| | |
|---|---|
| ***G06T 11/20*** | (2026.01) |
| ***G06T 5/50*** | (2006.01) |
| ***G06T 7/90*** | (2017.01) |
| ***G06T 11/60*** | (2006.01) |
| ***G06V 10/60*** | (2022.01) |

(52) U.S. Cl.

CPC ................ *G06V 10/60* (2022.01); *G06T 5/50* (2013.01); *G06T 7/90* (2017.01); *G06T 11/20* (2013.01); *G06T 11/60* (2013.01); *G06T 2207/10024* (2013.01); *G06T 2207/20221* (2013.01)

(58) Field of Classification Search

None

See application file for complete search history.

(56) References Cited

U.S. PATENT DOCUMENTS 11,790,344 B2 * 10/2023 Zhu .................. G06K 19/06028
235/494

FOREIGN PATENT DOCUMENTS

JP 2008033625 A 2/2008
JP 2015127891 A 7/2015

OTHER PUBLICATIONS

Lin et al., Aesthetic QR code generation with background contrast enhancement and user interaction, Jul. 26, 2018, Third International Workshop on Pattern Recognition, 1-7 (Year: 2018).*

* cited by examiner

*Primary Examiner* — Robert J Craddock

(74) *Attorney, Agent, or Firm* — Cowan, Liebowitz & Latman, P.C.

(57) ABSTRACT

An image processing apparatus according to the present invention includes a processor, and a memory storing a program which, when executed by the processor, causes the image processing apparatus to perform acquisition processing to acquire color information of at least one of a region in which a two-dimensional code is to be disposed and a peripheral region of the region on an image, and perform drawing processing to draw the two-dimensional code on the image, wherein in the drawing processing, respective colors of a foreground and a background of the two-dimensional code are determined based on the color information.

17 Claims, 18 Drawing Sheets

IMAGE PROCESSING APPARATUS, IMAGE PROCESSING METHOD, AND NON-TRANSITORY COMPUTER READABLE MEDIUM

BACKGROUND OF THE INVENTION

Field of the Invention

The present invention relates to an image processing apparatus, an image processing method, and a non-transitory computer readable medium.

Description of the Related Art

In recent years the digitization of photographs has progressed, and such information as a photographing date, a model name of the photographing device, and the GPS data of the photographing place can be recorded with the photographic data. Furthermore, even a home printer can easily print a two-dimensional code (geometric pattern, such as a QR code (registered trademark) or a barcode), which includes a photographing data and time, address of a home page and a photographing place, along with a photographic image. In the case of printing a two-dimensional code along with a photographic image, the photographic image may be reduced to be small and the two-dimensional code may be printed outside of the photographic image, or the two-dimensional code may be printed on a partial region of the photographic image, for example, so that the photographic image and the two-dimensional code are both printed within the printable region. In a case of using a printer of which printable region is small (e.g. printer of which one side of the printable region is about 2 to 3 inches), the latter method (printing the two-dimensional code on a partial region of the photographic image) is more frequently used.

The two-dimensional code is normally created using two colors of which brightness difference is large, such as white and black, so as to be easily read. In a case of the method of printing the two-dimensional code on a partial region of the photographic image, the partial region of the photographic image is normally made to be blank, and the black code information is combined with the blank region. Therefore, if the two-dimensional code is printed on the partial region of the photographic image, the two-dimensional code clearly stands out, and a sense of incongruity may be generated, or beauty and artistic qualities of the photographic image may be diminished.

Japanese Patent Application Publication No. 2008-33625 discloses a method of inserting a barcode into an image region which satisfies a predetermined condition. Japanese Patent Application Publication No. 2015-127891 discloses a method of adjusting a transmittance of the partial region of the two-dimensional code, so that the color of the background transmits through, and the colors of the other regions are adjusted to the colors similar to the background colors thereof.

However in the case of the method disclosed in Japanese Patent Application Publication No. 2008-33625, depending on the image, a barcode is disposed at a position significantly deviated from the intention of the user, which generates a sense of incongruity. For example, many users prefer the two-dimensional code to being disposed on an edge of the image, but the two-dimensional code may be disposed at the center of the image.

In the case of the method disclosed in Japanese Patent Application Publication No. 2015-127891, if a gradation step difference is large in the image region in the background of the two-dimensional code, and the density of the step difference is high, the contrast ratio of the two-dimensional code becomes low, and the readability of the two-dimensional code diminishes. The contrast ratio of the two-dimensional code is a contrast ratio between the foreground and the background of the two-dimensional code, and in the case of the method disclosed in Japanese Patent Application Publication No. 2015-127891, the contrast ratio is a contrast ratio between the region for which transmittance was adjusted and the region for which transmittance was not adjusted.

SUMMARY OF THE INVENTION

The present invention provides a technique to acquire a two-dimensional code which can be clearly read, and which harmonizes well with the image.

An image processing apparatus according to the present invention includes a processor, and a memory storing a program which, when executed by the processor, causes the image processing apparatus to perform acquisition processing to acquire color information of at least one of a region in which a two-dimensional code is to be disposed and a peripheral region of the region on an image, and perform drawing processing to draw the two-dimensional code on the image, wherein in the drawing processing, respective colors of a foreground and a background of the two-dimensional code are determined based on the color information.

Further features of the present invention will become apparent from the following description of exemplary embodiments with reference to the attached drawings.

DESCRIPTION OF THE EMBODIMENTS

Embodiment 1

Embodiment 1 of the present invention will be described in detail with reference to the drawings. In the following description, "printing" refers to the entire series of processing and operations, from performing image printing based on a print instruction from a user to discharging the paper. "Image printing" refers to processing and operations to form an image on recording paper by thermally transferring a transfer material (ink, overcoat) coated on an ink sheet to the recording paper, for example.

Figure 1A:
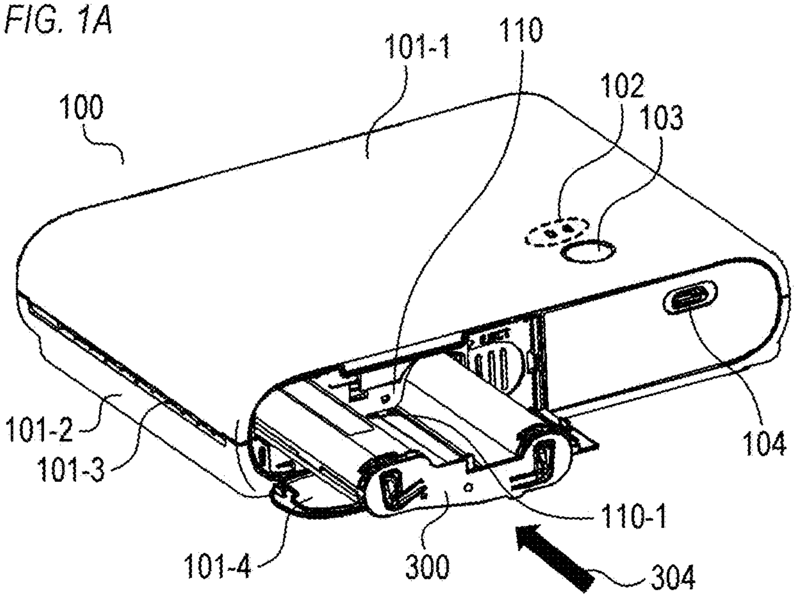
FIGS. 1A and 1B are external views of a printer.
Figure 1C:
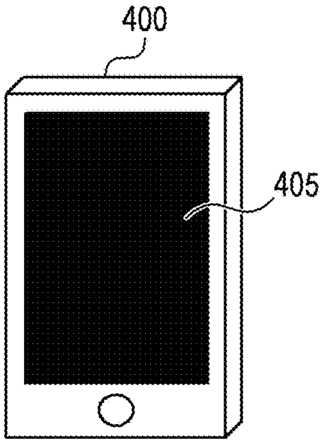
FIG. 1C is an external view of a portable terminal.
Figure 1B:
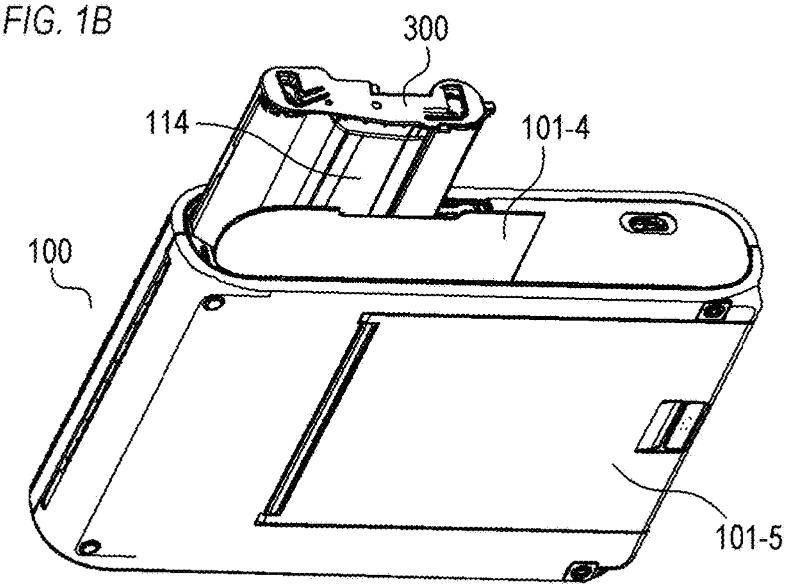

FIGS. 1A and 1B are external views of a printer 100 according to Embodiment 1. FIG. 1C is an external view of a portable terminal 400 according to Embodiment 1. FIG. 1A is a perspective view viewed from the top side of the printer 100, and FIG. 1B is a perspective view viewed from the bottom side of the printer 100.

As illustrated in FIG. 1A, the printer 100 is covered by an upper main body case 101-1 and a lower main body case 101-2, which are the top and bottom exteriors. On one side face (one end side) of the printer 100, a paper delivery port 101-3 (opening), which is a space between the upper main body case 101-1 and the lower main body case 101-2, is created. During printing, recording paper 113 temporarily protrudes out of the printer 100 through the paper delivery port 101-3, or recording paper 113 after image printing is discharged through the paper delivery port 101-3. In FIGS. 1A and 1B, the recording paper 113 is not illustrated. An indication unit 102 includes LEDs, and indicates the lighting or blinking of a plurality of colors of the LEDs through a window portion on the surface. By this lighting and blinking, the power supply state of the printer 100, and such status information on print operations and errors can be indicated. The power supply switch 103 is an operation button disposed adjacent to the indication unit 102. By pressing the power supply switch 103, ON/OFF of the power supply of the printer 100 can be switched. On another side face of the printer 100, an openable cassette cover 101-4 is disposed, and a cassette installing portion 110-1 (opening portion) is disposed on a chassis 110 inside of the cassette cover 101-4. An ink ribbon cassette 300 can be installed inside of the cassette installing portion 110-1 in the direction of the arrow 304. In the ink ribbon cassette 300, an ink ribbon 114, on which a sublimation ink is coated, is stored. A USB connector 104, which is an external interface, is disposed on the same face as the installing surface of the ink ribbon cassette 300. A tray cover 101-5 is disposed on the bottom surface of the printer 100. When the tray cover 101-5 is opened, recording paper 113 for image printing can be stored in the printer 100.

Figure 2:
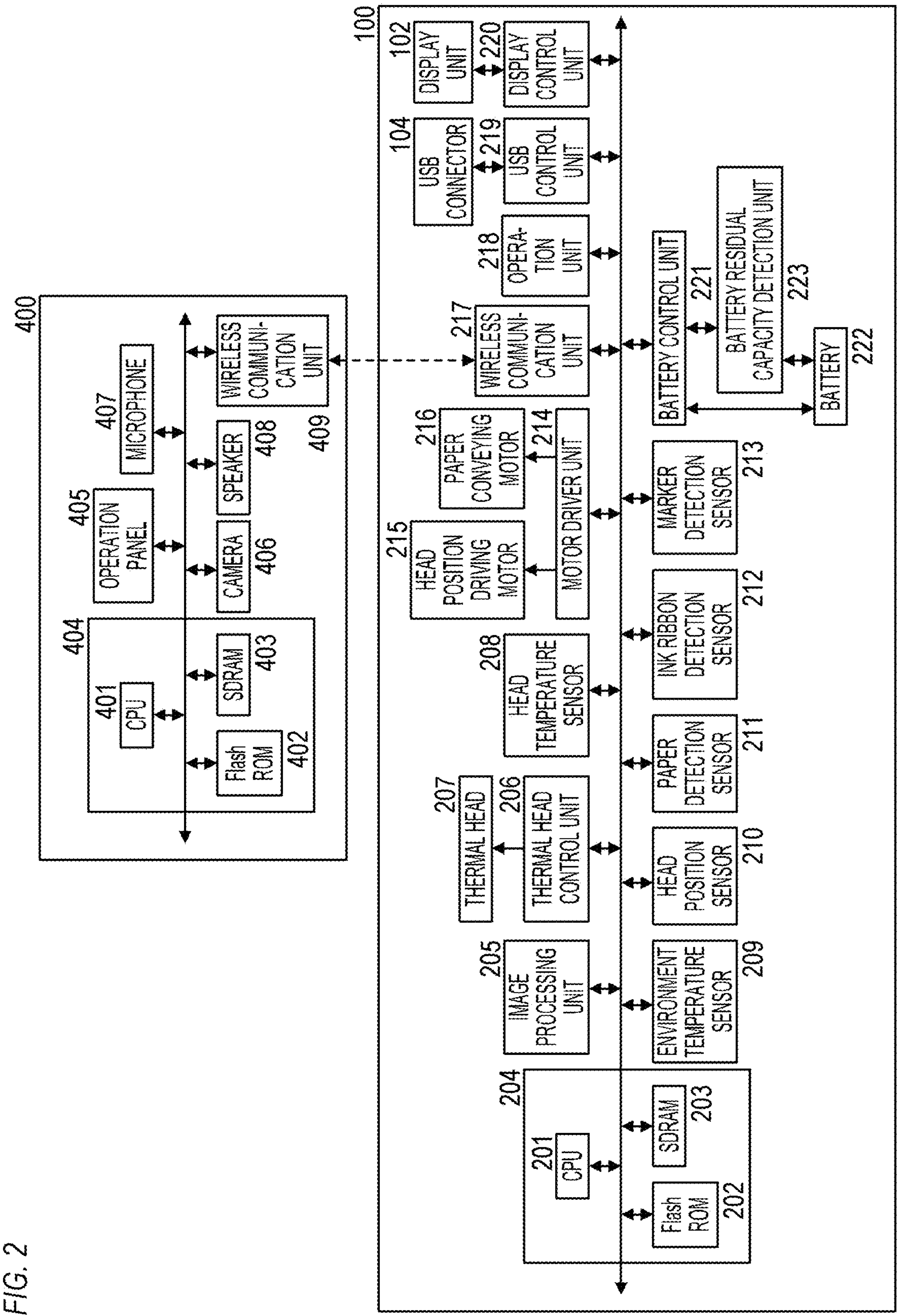
FIG. 2 is a block diagram of a print system.

FIG. 2 is a block diagram of the print system according to Embodiment 1. The portable terminal 400 and the printer 100 communicate and control each other wirelessly. Essentially the portable terminal 400 sends image data to be printed and print instructions, and the printer 100 executes the printing of the photo in accordance with the received data and instructions.

A configuration inside of the printer 100 will be described first. A CPU 201 performs the system control and arithmetic processing of the printer 100. A flash ROM 202 stores programs for controlling the system of the printer 100. The CPU 201 reads a program from the flash ROM 202 and controls each component based on the read program. An SDRAM 203 temporarily stores image data. The SDRAM 203 is used for operating the data processing. A portion constituted of the CPU 201, the flash ROM 202, and the SDRAM 203 is called a main control unit 204 which mainly processes each control of the printer 100. The functions and processing of the printer 100, which will be described later, are implemented by the CPU 201 reading the programs stored in the flash ROM 202, and executing the programs.

An image processing unit 205 performs image processing of image data sent from the portable terminal 400. The image processing unit 205 performs various image processing, such as decompression processing of compressed image data, resize processing in accordance with paper to be used, and image correction processing, and generates print data for image printing based on the image data generated after the image processing. The processing of the image processing unit 205 may be performed by the main control unit 204 instead of the image processing unit 205, or may be performed by both the image processing unit 205 and the main control unit 204.

A thermal head control unit 206 converts the print data generated by the image processing unit 205 into electric signals, and outputs the electric signals to a thermal head 207. The thermal head 207 converts the electric signal into thermal energy, and transfers the dye of the ink ribbon to the paper.

A head temperature sensor 208 measures the temperature of the thermal head 207. An environment temperature sensor 209 measures the environment temperature inside of the printer 100. A head position sensor 210 detects such positions as a pressing position and a retracting position of the head. A paper detection sensor 211 detects a position of paper. An ink ribbon detection sensor 212 detects information on the ink ribbon. A marker detection sensor 213 detects a marker that is set on the ink ribbon.

A motor driver unit 214 controls a motor. A head position driving motor 215 is a motor for driving the head to the pressing position for image printing, or the retracting position for exchanging the ink ribbon cassettes and for conveying paper. A paper conveying motor 216 is a motor for conveying the paper. The main control unit 204 sends an instruction to the motor driver unit 214 in accordance with the sensor information of each sensor mentioned above and the information programmed in advance, and controls the driving of the head position driving motor 215 and the paper conveying motor 216.

A wireless communication unit 217 controls wireless communication with the portable terminal 400. An operation unit 218 receives operation instruction information from the power supply switch 103 and the like disposed on the surface of the upper main body case 101-1. A USB control unit 219 determines information from an external apparatus connected to the USB connector 104 (external interface) and performs communication control, performs power transfer control, and performs transmission control of various data, such as operation information and image data. Power can be received from the outside by connecting an external power supply adaptor or the like to the USB connector 104 using a USB cable.

A display control unit 220 controls the output of the indication unit 102, such as the lighting and blinking of the LEDs. A battery control unit 221 includes a charging circuit which performs charging control of a battery 222. A battery residual capacity detection unit 223 detects the residual capacity of the battery 222.

A configuration inside of the portable terminal 400 will be described next. Here the portable terminal 400 is assumed to be a smartphone, but may be other devices, such as a digital camera, a digital came machine, and a notebook PC, if the device includes a wireless communication function.

A CPU 401 performs system control and arithmetic processing for the portable terminal 400. A flash ROM 402 stores programs for controlling the system. The flash ROM 402 is a non-volatile storage medium that stores a control program for the portable terminal 400 and various data, such as photographs and electronic documents. An SDRAM 403 is used as a temporary storage region for a main memory, a work area, and the like of the CPU 401. A portion constituted of the CPU 401, the flash ROM 402 and the SDRAM 403 is called a main control unit 404, which mainly processes each control of the portable terminal 400. In Embodiment 1, one CPU 401 is assumed to execute each processing step of a later mentioned flow chart, but other modes may be used. For example, a plurality of CPUs may collaboratively execute each processing step of the later mentioned flow chart. A part of the later mentioned flow chart may be executed using such a hard circuit as an ASIC.

The CPU 401 reads a program from the flash ROM 402, and controls each component based on the read program. For example, the CPU 401 reads a program from the basic software (OS), and controls operation of the portable terminal 400. The portable terminal can install various applications including a print application, and the CPU 401 can also read a program of an installed application, and control the operation of the portable terminal 400 thereby. The OS controls the operation of the portable terminal 400 in accordance with the instruction received from each application, and an operation instruction the user inputs via an operation panel 405. The print application is an application to provide a print function to the user. The print application instructs the OS to generate a print job, and to transmit the generated print job, for example. Besides the print application, various applications have been installed in the portable terminal 400, but description on other applications is omitted here.

The operation panel 405 includes a touch panel function to detect the touch operations of the user, and displays various screens. By performing the touch operations on the operation panel 405, the user can input a desired instruction to the portable terminal 400. The portable terminal 400 includes hardware keys (not illustrated), and the user can also input operation instructions to the portable terminal 400 using the hardware keys.

A camera 406 captures an image in accordance with an image capturing instruction by the user. The photograph captured by the camera 406 is stored in a predetermined region of the flash ROM 402. A microphone 407 inputs sound and the speaker 408 outputs sound. The microphone 407 and the speaker 408 are mainly used when the user has a telephone conversation with another portable terminal or with a landline telephone. A wireless communication unit 409 controls wireless communication with the printer 100.

Figure 3:
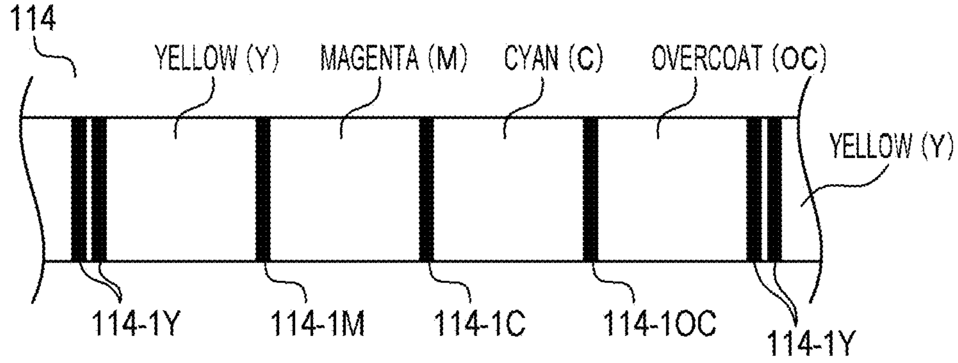
FIG. 3 is a developed view of an ink ribbon.

Now a configuration of an ink ribbon 114 will be described with reference to FIG. 3. FIG. 3 is a developed view of the ink ribbon 114. In a case of full color printing, it is common that an ink ribbon on which each color of yellow (Y), magenta (M) and cyan (C) is coated on the surface side by side is used as the ink ribbon 114, and each color is printed superimposed on an image printing medium, whereby a full color image is formed. Then a colorless transparent overcoat (OC) surface is formed. A black band-shaped marker 114-1 is formed among each color and the OC surface, so as to detect a head position of each surface. There are two markers 114-1Y to indicate the head position of the yellow (Y) surface (marker 114-1Y to distinguish between the yellow (Y) surface and another surface). There is one marker 114-1M to indicate the head position of the magenta (M) surface, one marker 114-1C to indicate the head position of the cyan (C) surface, and one marker 114-10C to indicate the head position of the OC surface. The ink ribbon 114 here is assumed to be a sublimation ink ribbon. A high heat resistant film, such as a polyethylene terephthalate film with a thickness of about 2 to 10 microns, is used as the base material. On this film, the sublimation ink prepared by mixing each eye, binder, plasticizer, bond and the like is coated to a 0.2 to 5 μm thickness, whereby each color dye coated surface of yellow (Y), magenta (M) and cyan (C) is formed. Further, on this film, styrene dielectric, styrene resin, styrene copolymer, binder and the like are coated to about a 0.5 to 5 μm thickness, whereby the colorless transparent overcoat surface is formed. On the opposite side of the surface on which ink is coated, a lubricating material, which decreases the frictional resistance with a sliding portion so as to stabilize the traveling of the ink ribbon, a polishing agent to polish and clean the surface of a thermal head, and the like are coated.

Figure 4A:
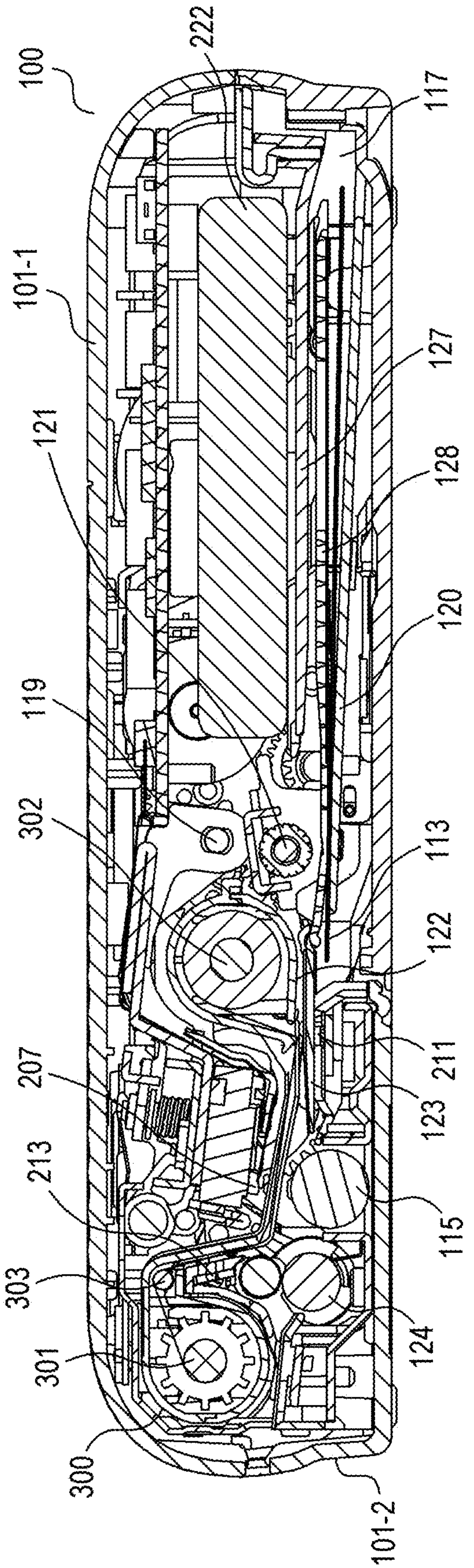
FIG. 4A is a cross-sectional view of a printer.
Figure 4B:
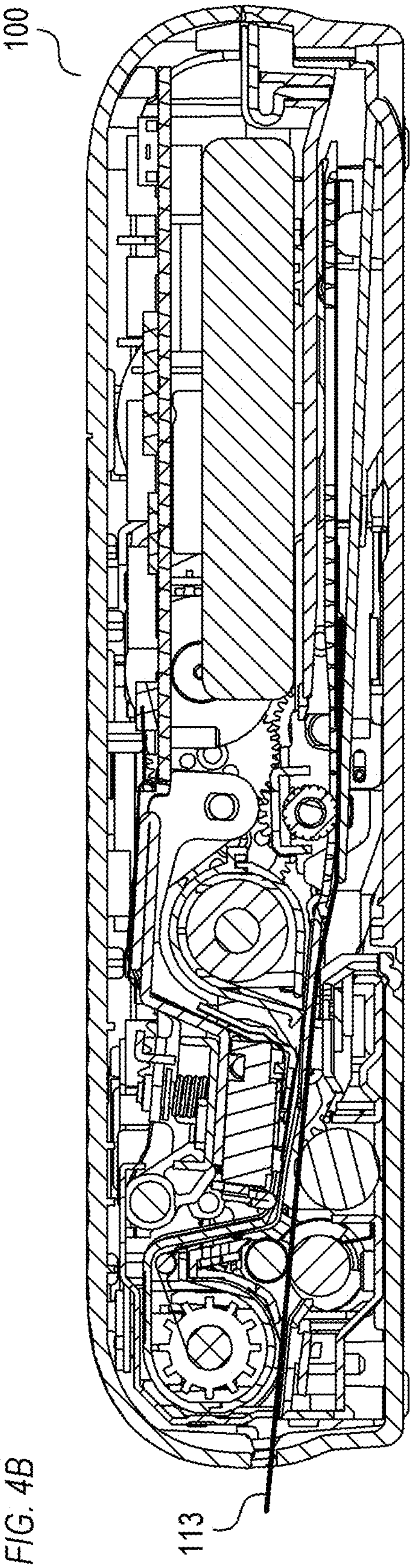
FIG. 4B is a cross-sectional view of a printer.
Figure 4C:
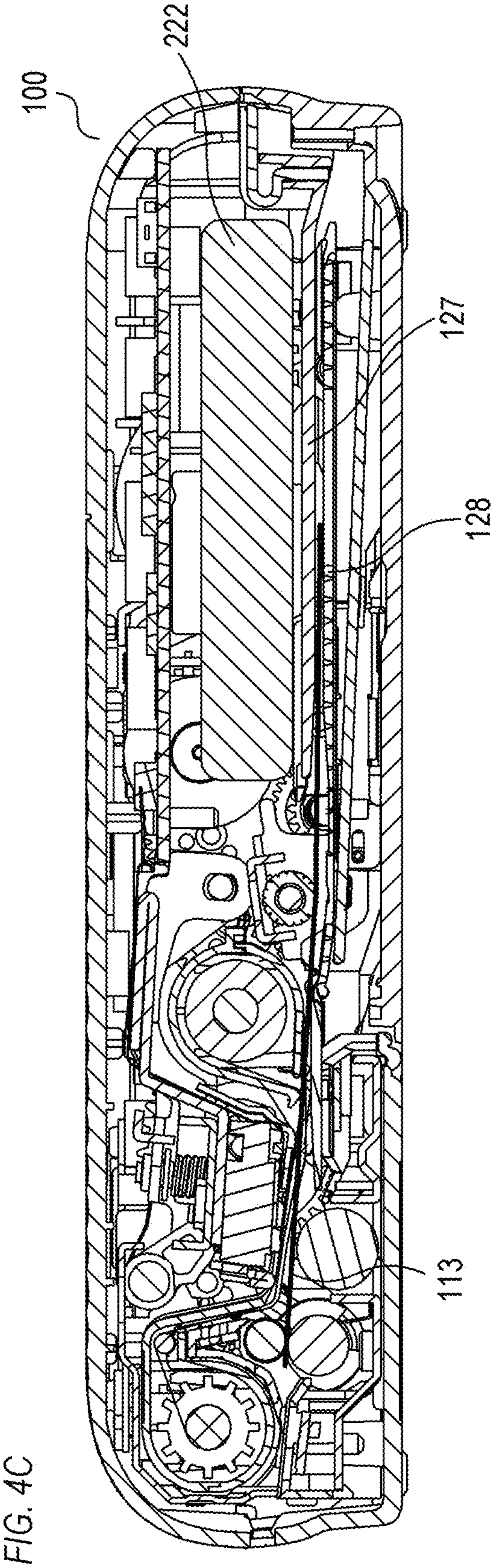
FIG. 4C is a cross-sectional view of a printer.
Figure 4D:
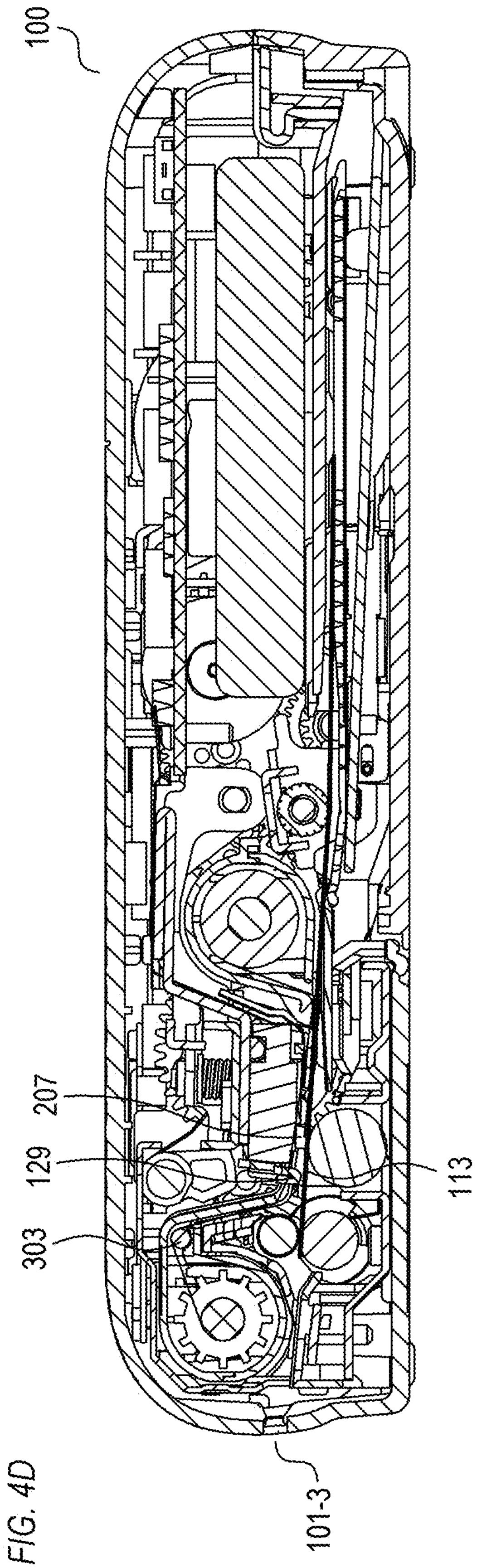
FIG. 4D is a cross-sectional view of a printer.

Now the print operation of the printer 100 will be described with reference to FIGS. 4A to 4E and FIG. 5. FIGS. 4A to 4E are cross-sectional views to indicate an operation of the printer 100, and FIG. 5 is a flow chart of the print operation of the printer 100. FIG. 4A indicates an image printing standby state, FIG. 4B indicates a paper feeding state, FIG. 4C indicates a state during the image printing operation, FIG. 4D indicates a state after ending the image printing and before paper delivery, and FIG. 4E indicates a state after the paper delivery.

When the user sets the ink ribbon cassette 300 in the printer 100, loads the recording paper 113 in the paper storing unit 117, and presses the power supply switch 103, the printer 100 enters a standby state. The printer 100 includes a platen roller 115 and the thermal head 207. The thermal head 207 is rotatably supported by a thermal head rotating shaft 119, and is disposed at a position farthest possible from the platen roller 115, so that the ink ribbon cassette 300 does not interfere with the thermal head 207 when the ink ribbon cassette 300 is inserted or removed.

When the image data to be printed is specified on the portable terminal 400 and printing is instructed, the printer 100 receives print instruction information via the wireless communication unit 217. Then the printer 100 starts print operation. This operation is implemented by the CPU 201 of the printer 100 developing the program stored in the flash ROM 202 on the SDRAM 203, and executing the program.

In step S501, the CPU 201 controls the driving of the head position driving motor 215 using a driving force (not illustrated). Then the support portion of the thermal head 207 rotates counterclockwise in this illustration, around the thermal head rotating shaft 119, and as indicated in FIG. 4B, the thermal head 207 moves to an intermediate position between the standby position indicated in FIG. 4A, and the image printing position (position where a nip is generated with the platen roller 115) indicated in FIG. 4C.

When the moving of the thermal head 207 completes, the CPU 201 starts the paper feeding operation in S502. When the paper feeding operation starts, a pressing plate 120 included in the printer 100 is energized toward the paper feeding roller 121 by energizing means (not illustrated), pushes a recording paper 113, loaded in the paper storing unit 117, up to the paper feeding roller 121. At the standby position indicated in FIG. 4A, the paper feeding roller 121 is retracted to a position distant from the recording paper 113. In the intermediate position indicated in FIG. 4B, the paper feeding roller 121 is pushed up to a position that is in contact with the recording paper 113 by a driving force (not illustrated). Here the paper feeding roller 121 rotates counterclockwise indicated in this illustration, by the transfer of the driving force of the paper conveying motor 216 (not illustrated), and conveys the press-contacted recording paper 113 to an image printing recording portion which is constituted of the thermal head 207 and the platen roller 115. The recording paper 113 contacts with a separating bank 122 created in the printer 100, and only one sheet of recording paper 113, the sheet which is on the very top, is conveyed.

Then the conveyed recording paper 113 is detected by the paper detection sensor 211, and it is confirmed whether a paper feeding operation failure occurred. If there is no paper feeding operation failure, the recording paper 113, conveyed by the paper feeding roller 121, is rotated clockwise in this illustration, by a switching plate 123, which is rotatably supported, that is pushed upward, and advances in the left direction in this illustration. Then the recording paper 113 enters into the nip between a conveying roller 124 and a conveying driven roller 125. On the conveying roller 124, a plurality of microscopic protrusions, which pierce the rear face of the recording paper 113, are formed, whereby the recording paper 113 can be accurately conveyed. The conveying roller 124 is driven by the paper conveying motor 216 (not illustrated). The paper conveying motor 216 is a stepping motor, and can accurately control the feed amount.

After the recording paper 113 is conveyed to the nip between the conveying roller 124 and the conveying driven roller 125, the paper feeding roller 121 moves to a position disposed in the standby state indicated in FIG. 4A by a driving force (not illustrated). This is to prevent other sheets of paper in the paper storing unit 117 from being conveyed by the paper feeding roller 121 in error. Then the recording paper 113 is continuously conveyed by the conveying roller 124 and the conveying driven roller 125, and the rear end of the recording paper 113 passes through the paper detection sensor 211. After the recording paper 113 is conveyed for a predetermined amount and exits the front end of the switching plate 123, conveying stops. Then in step S503, the CPU 201 conveys the recording paper 113 in the opposite direction and stops the recording paper 113 at an image printing start position, indicated in FIG. 4C. Here during feeding, the rear end of the recording paper 113 passes the upper side of the switching plate 123, passes the lower side of the paper feeding roller 121, and is conveyed into a space between a guide wall 127, which separates and holds the lower part of the battery 222, and a paper storage unit wall 128.

When the paper feeding operation ends and the recording paper 113 stops at the image printing start position, the CPU 201 performs a head detection operation of the ink ribbon 114 in step S504.

Now the head direction operation of the ink ribbon 114 will be described. When the paper is conveyed to the position indicated in FIG. 4C, and conveying to the image printing start position completes, the ink ribbon 114 stored in the ink ribbon cassette 300 is wound up. In other words, the tip of a winding shaft 301, disposed inside of the ink ribbon cassette 300, is engaged with an engaging unit included in the printer 100, and is rotated counterclockwise in this illustration by a driving force (not illustrated), whereby the ink ribbon 114, wound around a supply shaft 302, is wound up around the winding shaft 301. As illustrated in FIG. 2, a marker is disposed in the head position of each color of the ink ribbon 114. Two markers are disposed in the beginning of yellow (Y), and one marker is disposed in each of the beginning of magenta (M), cyan (C) and overcoat (OC) respectively. The printer 100 includes the marker detection sensor 213, which is a reflection type optical sensor, and conveying of the ink ribbon is stopped and head detection is performed when the marker (interruption of reflection light by the marker) disposed on the ink ribbon 114 is detected.

In S505, the CPU 201 determines whether the marker is corrected detected. In the case of the head detection of yellow (Y), it is determined whether the two markers are detected within a predetermined time, and in the case of the head detection of magenta (M), cyan (C) and overcoat (OC), it is determined whether the one marker is detected within a predetermined time. Processing advances to step S508 if the markers were correctly detected (a predetermined number of markers were detected within a predetermined time), or advances to S506 if not.

In S506, the CPU 201 causes the indication unit 102 to blink, which indicates an abnormality (error) of the ink ribbon cassette 300. In S507, the CPU 201 notifies the portable terminal 400 of the abnormality generated in the ink ribbon via the wireless communication unit 217.

When the head detection completes, the CPU 201 in S508 rotates the unit holding the thermal head 207 counterclockwise in this illustration around the thermal head rotating shaft 119. Thereby the thermal head 207 moves to the image printing position where the ink ribbon 114 and the recording paper 113 are held between the thermal head 207 and the platen roller 115.

When the thermal head 207 moves to the image printing position, the CPU 201 determines a type of image printing in S509. Then the head detection of yellow (Y), magenta (M) or cyan (C) is performed, and processing advances to S510 if printing of this color is performed, or advances to S513 if not.

In S510, the CPU 201 performs image printing of the color of which head was detected. As illustrated in FIG. 4D, the recording paper 113 and the ink ribbon 114 are pressed and held between the thermal head 207 and the platen roller 115, and are conveyed in this state toward the paper delivery port 101-3 while being heated by the thermal head 207. Thus, the ink coated on the ink ribbon 114 is transferred to the recording paper 113 and image printing is performed thereby. The ink ribbon conveying mechanism included in the printer 100 encloses a torque limiter mechanism (not illustrated) which slips when load a predetermined torque or more is applied, and the ink ribbon 114 and the recording paper 113 are conveyed at the same speed during the image printing operation. When the image printing performed with heating by the thermal head 207, the ink ribbon 114 and the recording paper 113 are conveyed maintaining the contacted state for a predetermined distance, then are conveyed in directions separating from each other. In other words, the recording paper 113 is conveyed in the left direction in this illustration by the conveying roller 124, and the ink ribbon 114 is conveyed toward a guide shaft 303 disposed inside of the ink ribbon cassette 300, while sliding on a separating plate 129 which is integrated with the thermal head 207. The ink ribbon 114 is adhered to the recording paper 113 through heating by the thermal head 207, but is separated from the recording paper 113 when conveyed to the position of the separating plate 129.

When the image printing of the color of which head was detected completes, the CPU 201 in S511 rotates the unit holding the thermal head 207 by a driving force (not illustrated), and retracts the unit from the recording paper 113 to the intermediate position indicated in FIG. 4B. Then in S512, the CPU 201 conveys the recording paper 113 in the opposite direction, and stops the recording paper 113 at an image printing start position indicated in FIG. 4C.

When the image printing of yellow (Y), magenta (M) and cyan (C) completes, the CPU 201 performs image printing of overcoat (OC) in S513. As mentioned above, ink dye is transferred in the image printing of yellow (Y), magenta (M) and cyan (C). In the overcoat processing (image printing of overcoat), the above mentioned resin is melted and transferred in order to form the overcoat layer. By transferring the overcoat layer, a uniform gloss can be applied on the entire surface of the recording paper 113. Further, information can be recorded on the overcoat layer as well by the thermal head 207 changing the transfer amount of the coat resin to form the overcoat layer. Specifically, by partially supplying energy higher than usual by controlling the output (heat value) of the thermal head 207, the surface of the protective layer of the coat resin can be roughened, and a low gloss area can be formed. Further, by partially changing the gloss of the surface of the recording paper 113, the impression (texture) of the printed matter can be changed. Information can also be recorded using the difference in gloss (surface treatment).

Figure 4E:
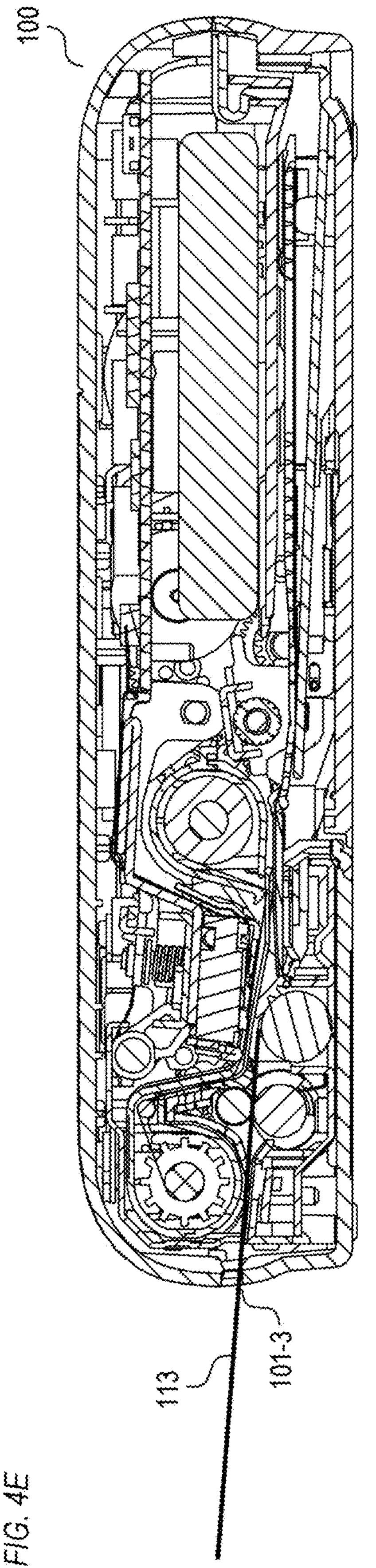
FIG. 4E is a cross-sectional view of a printer.
Figure 5:
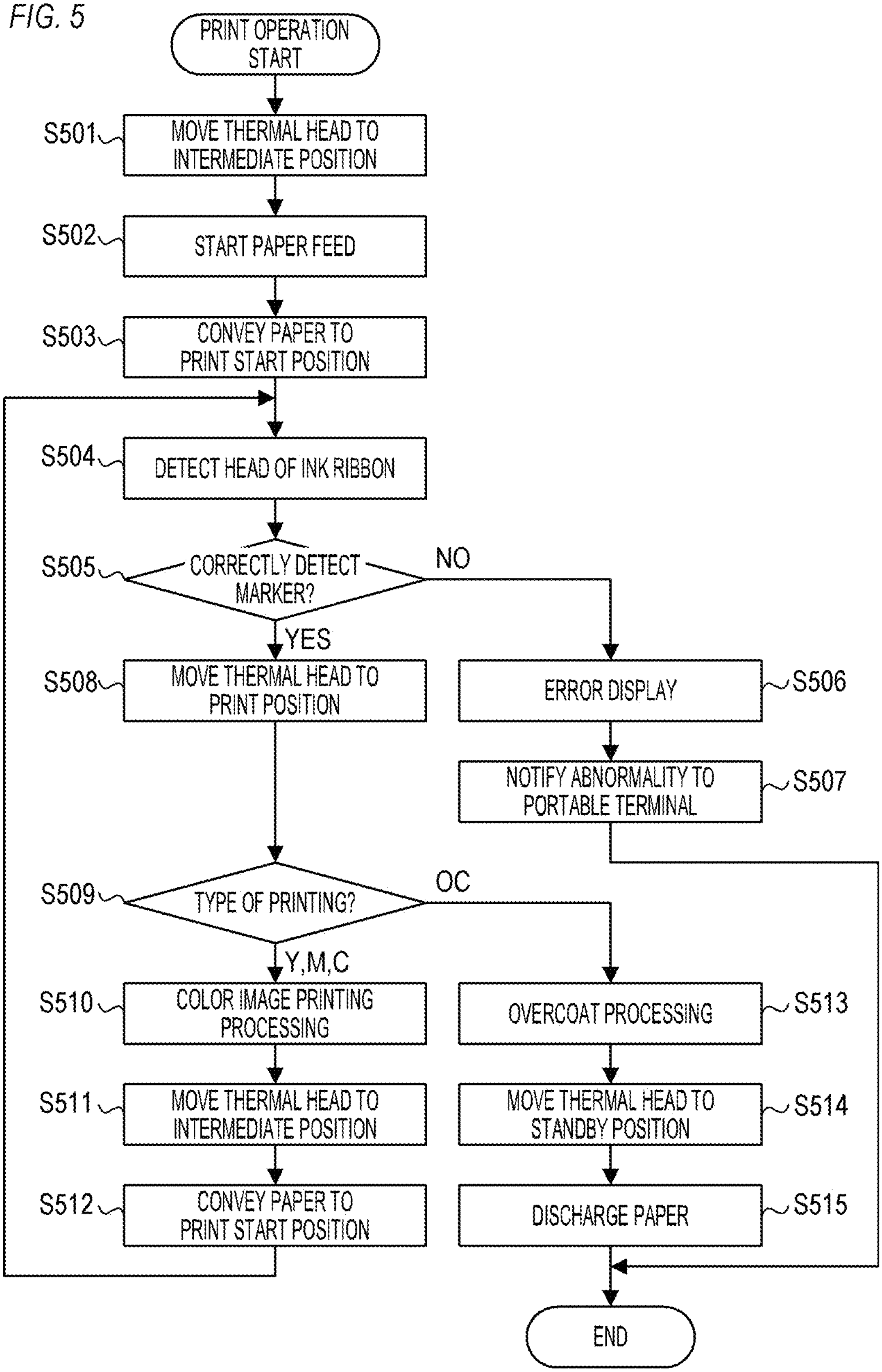
FIG. 5 is a flow chart of a print operation.

When the image printing of the overcoat completes, the CPU 201 in S514 rotates the unit holding the thermal head 207 by a driving force (not illustrated), and retracts the unit from the recording paper 113 to the standby position indicated in FIG. 4E. Then in S515, the CPU 201 further conveys the recording paper 113 from the paper delivery port 101-3 in the discharging direction. Paper delivery completes when the rear end of the paper exits the conveying roller 124. When paper delivery completes, the printer 100 ends the print operation. Thus, the ink and resin are superimposed and transferred in the sequence of yellow, magenta, cyan and overcoat, whereby the image printing operation completes.

Figure 6:
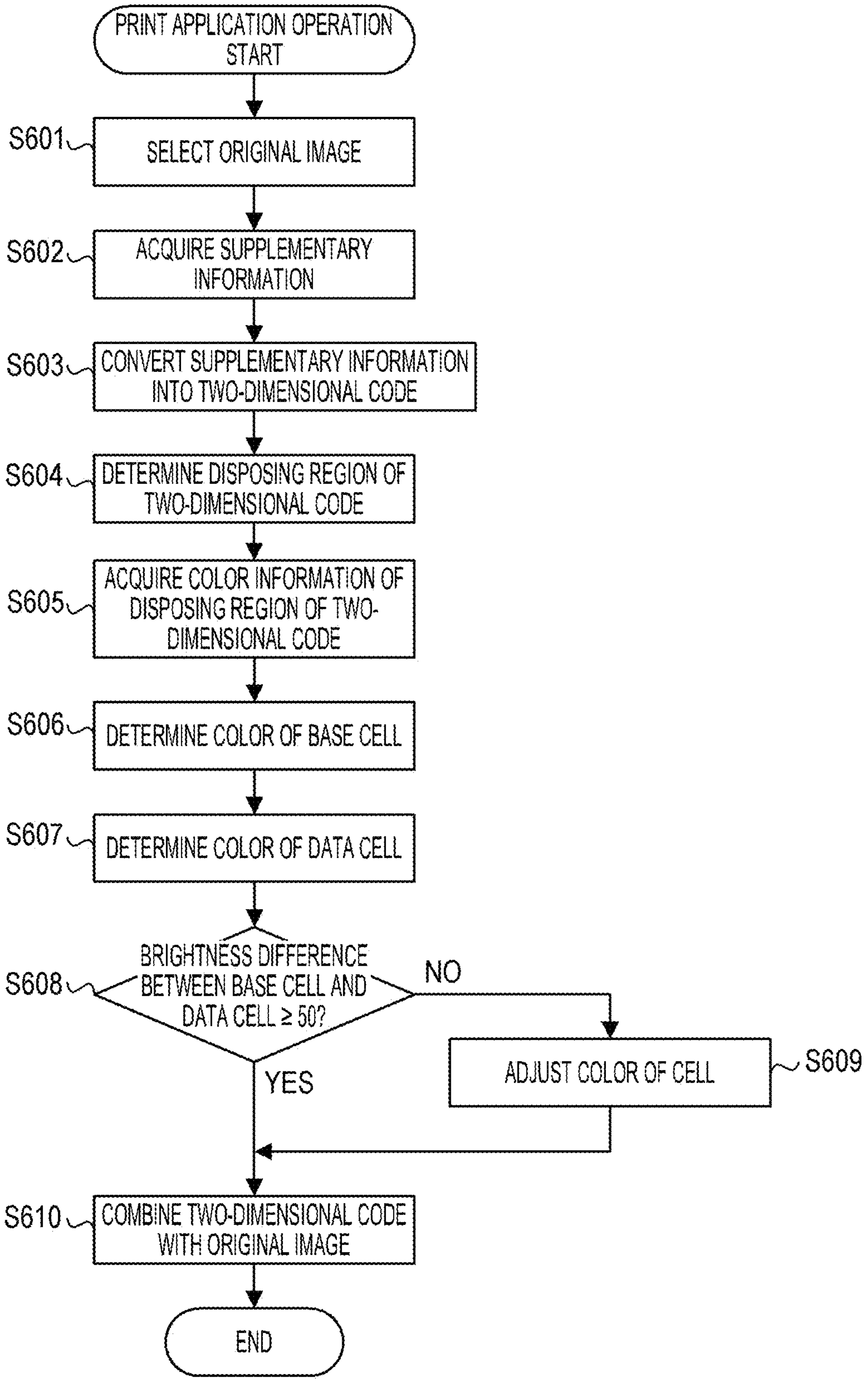
FIG. 6 is a flow chart of a print application operation according to Embodiment 1.

Now the operation and method for creation, combining and printing of a color two-dimensional code will be described with reference to FIGS. 6 to 10F. FIG. 6 is a flow chart of the print application operation to create and combine a color two-dimensional code. When the user instructs to start (execute) the print application to the portable terminal 400, the portable terminal 400 starts the print application operation. This operation is implemented by the CPU 401 of the portable terminal 400 developing a print program (program of the print application) stored in the flash ROM 402 on the SDRAM 403, and executing the program.

Figure 7A:
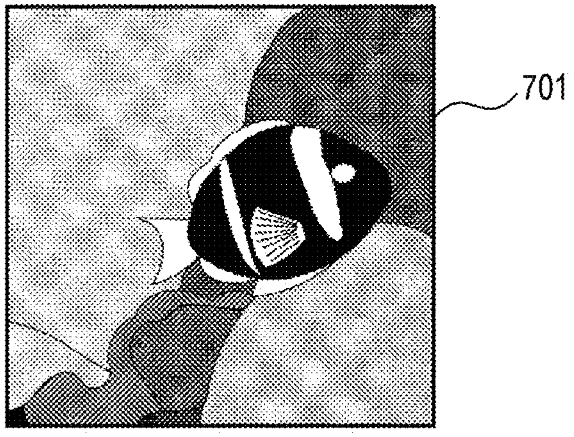
FIG. 7A is a diagram indicating an original image.
Figure 7B:
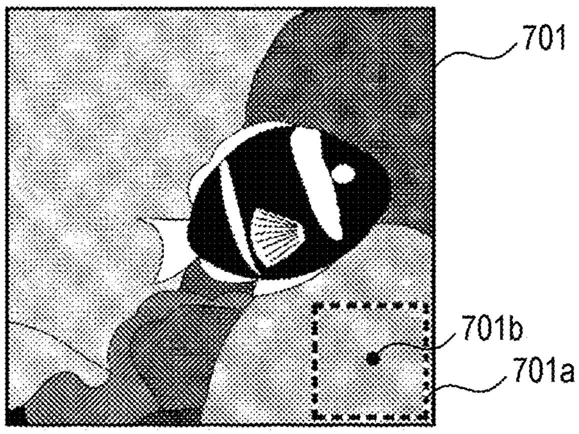
FIG. 7B is a diagram indicating a disposing region of a two-dimensional code.
Figure 7C:
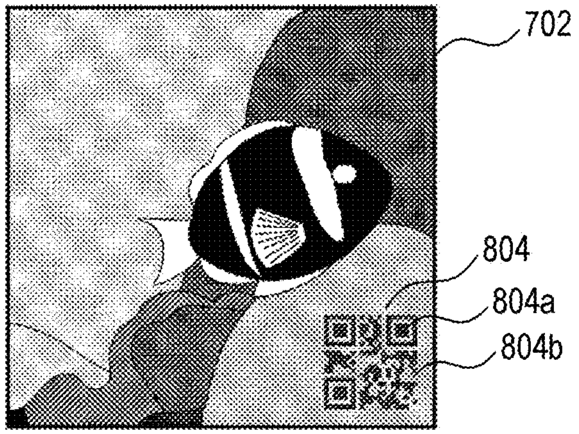
FIG. 7C is a diagram indicating a composite image.

In step S601, the CPU 401 selects an image specified by the user from the images recorded in the flash ROM 402, and determines this as an image (original image) to be printed. FIGS. 7A to 7C are diagrams indicating a process of combining such a two-dimensional code as a QR code and a barcode with the original image. FIG. 7A indicates an original image, FIG. 7B indicates a disposing region of the two-dimensional code, and FIG. 7C indicates an image after the two-dimensional code is combined. It is assumed that the original image 701 in FIG. 7A is selected and determined in S601.

In S602, the CPU 401 acquires information selected or inputted by the user, and determines this information as supplementary information to be combined with the original image. The supplementary information includes link information, such as a URL which indicates the storage location of data related to the original image (e.g. still image data, moving image data, audio data and the like stored in the server). In the case where the original image is a photographic image, the supplementary information may include GPS position information that indicates the location where this photographic image was captured. The supplementary information is information on numbers and text.

Figure 8A:
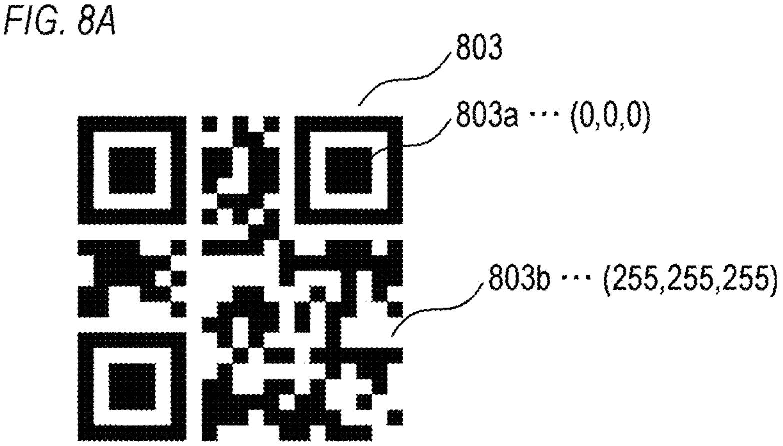
FIGS. 8A and 8B are diagrams indicating a two-dimensional code.
Figure 8B:
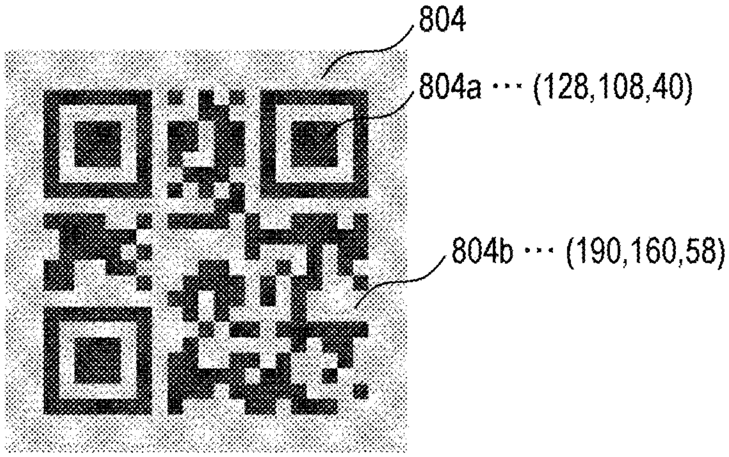

In S603, the CPU 401 encodes (converts) the supplementary information into a two-dimensional code (image). FIGS. 8A and 8B are diagrams indicating the created two-dimensional code. FIG. 8A indicates an encoded two-dimensional code, and FIG. 8B indicates a two-dimensional code on which the later mentioned color setting was performed (color two-dimensional code). A two-dimensional code 803 indicated in FIG. 8A is constituted of a data cell 803*a* which is a foreground, and a base cell 803*b* which is a background. The color of the data cell 803*a* is black, and the pixel values (RGB values (R value, G value, B value)) thereof are (0, 0, 0). The color of the base cell 803*b* is white, and the pixel values (RGB values) thereof are (255, 255, 255). The two-dimensional code encoded like this is constituted of two colors (white and black) of cells.

In S604, the CPU 401 determines (sets) the region specified by the user as the region where two-dimensional code is disposed (disposing region). For example, the CPU 401 displays a user interface screen, including the original image 701, on the operation panel 405. The user specifies a part of the original image 701 as the disposing region of the two-dimensional code by such user operation as touch operation on the operation panel 405 (user interface screen). Here it is assumed that a position 701*b* indicated in FIG. 7B is specified, and the region 701*a* at the position 701*b* is specified as the disposing region of the two-dimensional code. The user can determine the disposing region of the two-dimensional code while confirming the specified region on the user interface screen. The user may specify an arbitrary position, or may specify a position by selecting one of a plurality of predetermined positions.

In S605, the CPU 401 acquires color information of the disposing region of the two-dimensional code. For example, from the original image, the CPU 401 acquires (extracts) one color information indicating a color of one pixel, a plurality of color information indicating the colors of a plurality of pixels, one color information indicating a color of one pixel block, or a plurality of color information indicating the colors of a plurality of color blocks, in the disposing region 701*a* of the two-dimensional code. One pixel block is constituted of a plurality of pixels. In order to recognize a representative color in the disposing region 701*a*, it is preferable to acquire color information considering a plurality of pixels. All the pixels in the disposing region 701*a* may be considered, or only a part of the pixels may be considered. By decreasing a number of pixels to be considered, processing load can be reduced, or processing time can be shortened. Here it is assumed that color information indicating the RGB values is acquired.

In S606, the CPU 401 determines a color of the base cell (background) of the two-dimensional code based on the acquired (extracted) color information. For example, it is assumed that a plurality of color information, which corresponds to a plurality of portions of the disposing region of the two-dimensional code respectively, are acquired. In this case, an average color of the colors of the plurality of portions may be determined as the color of the base cell. Further, a color of a portion of which brightness or lightness is the highest among the plurality of portions may be determined as the color of the base cell. The method for determining the color of the base cell is not limited to this, and the color, specified using an arbitrary algorithm for specifying a representative color in the disposing region of the two-dimensional code, may be determined as the color of the base cell.

Both the brightness and lightness indicate a degree of luminance, but the brightness is a value considering the difference of luminance generated by the color, and the lightness is a value when the chroma is zero. For the value of the brightness, a Y value determined by the following Expression 1 may be used. For the value of the lightness, a maximum value of the R value, G value and B value may be used.

$$Y\text{ value}=0.2126\times R\text{ value}+0.7152\times G\text{ value}+0.0722\times B\text{ value} \quad \text{Expression 1}$$

In S607, the CPU 401 determines the color of the data cell (foreground) of the two-dimensional code based on the acquired (extracted) color information. The color of the base cell (background), of which brightness or lightness is changed, may be determined as the color of the data cell. For example, it is assumed that a plurality of color information, corresponding to a plurality of portions of the disposing region of the two-dimensional code respectively, are acquired. In this case, a color, generated by decreasing the brightness or lightness from an average color of the plurality of portions without changing the hue, may be determined as the color of the data cell. A color of the portion having the lowest brightness or lightness among the plurality of portions may be determined as the color of the data cell.

The colors of the base cell and the data cell need be determined (set) so as to implement the contrast ratio (contrast ratio between the base cell and the data cell), with which the two-dimensional codes can be clearly read. Therefore, in Embodiment 1, the later mentioned processing steps S608 and S609 are performed, whereby the respective colors of the base cell and the data cell are determined respectively, such that the difference between the value of the brightness (or lightness) of the base cell and the value of the brightness (or lightness) of the data cell becomes a threshold or more. The inventor obtained knowledge via experiments that the two-dimensional codes can be clearly read if the difference between the value of the brightness (or lightness) of the base cell and the value of the brightness (or lightness) of the data cell is 50 or more (256 bit value) regardless the hue. Hence in Embodiment 1, a 256 bit value is used for a value of brightness (or lightness), and 50 is used as a threshold of the difference between the value of the brightness (or lightness) of the base cell and the value of the brightness (or lightness) of the data cell.

In step S608, the CPU 401 determines whether the difference between the value of the brightness (or lightness) corresponding to the color of the base cell determined in S606 and the value of the brightness (or lightness) corresponding to the color of the data cell determined in S607 is 50 or more. Processing advances to S610 if the difference is 50 or more, or to S609 if not.

In S609, the CPU 401 adjusts the color of at least one of the base cell and the data cell from the color corresponding to the color information (color determined in S606 and S607), so that the difference between the value of the brightness (or lightness) of the base cell and the value of the brightness (or lightness) of the data cell becomes 50 or more. Only the color of the base cell may be adjusted, or only the color of the data cell may be adjusted, or the colors of both the base cell and the data cell may be adjusted.

The data cell 804*a* and the base cell 804*b* of the two-dimensional code 804 indicated in FIG. 8B have the colors determined in S606 to S609. The pixel values (RGB values (R value, G value, B value)) of the data cell 804*a* are (128, 108, 40), and the pixel values (RGB values) of the base cell 804*b* are (190, 160, 58). The pixel values (190, 160, 58) of the base cell 804*b* are the same as the average pixel values of the entire disposing region 701*a* of the two-dimensional code. The pixel values (128, 108, 40) of the data cell 804*a* are the pixel values generated by decreasing the Y value from the pixel values (190, 160, 58) of the base cell 804*b* without changing the hue. The Y value calculated from the pixel values (128, 108, 40) of the data cell 804*a* is 107.3424, and the Y value calculated from the pixel values (190, 160, 58) of the base cell 804*b* is 159.0136. The difference between these Y values is 51.6712 (≥50), hence the two-dimensional code 804 can be clearly read.

In S610, the CPU 401 combines (draws) the two-dimensional code of the color determined in S606 to S609 on the original image. Thereby the image data of which printing is instructed to the printer 100 is completed. In the composite image 702 illustrated in FIG. 7C, the two-dimensional code 804 (color two-dimensional code) is combined at the lower right corner (disposing region 501*a* of the two-dimensional code) of the original image 701. The color of the base cell 804*b* of the two-dimensional code 804 is the same as the average color of the entire disposing region 701*a* of the two-dimensional code, and is close to the color of the original image 701 (disposing region 701*a*). The hue of the data cell 804*a* of the two-dimensional code 804 is the same as the hue of the base cell 804*b*, and is close to the hue of the original image 701 (disposing region 701*a*). Hence in the composite image 702, the two-dimensional code 804 harmonizes well without a sense of incongruity. Further, the difference between the Y value of the data cell 804*a* and the Y value of the base cell 804*b* is 50 or more, therefore the two-dimensional code 804 can be clearly read. In this way, the print application operation, to create and combine the color two-dimensional code, completes. The CPU 401 may display the composite image on the operation panel 405.

Figure 9A:
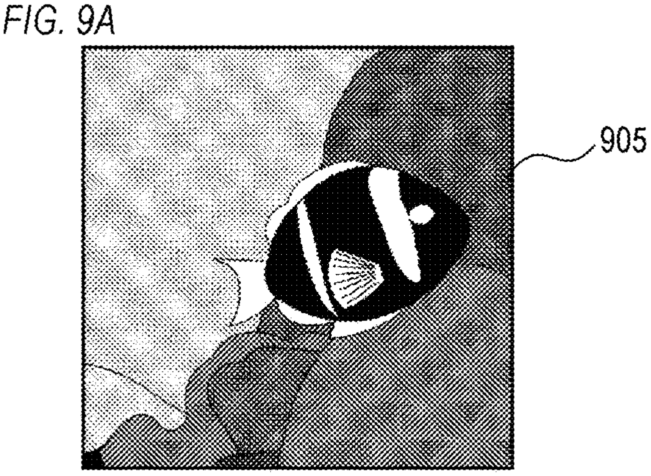
FIG. 9A is a diagram indicating an original image.
Figure 9B:
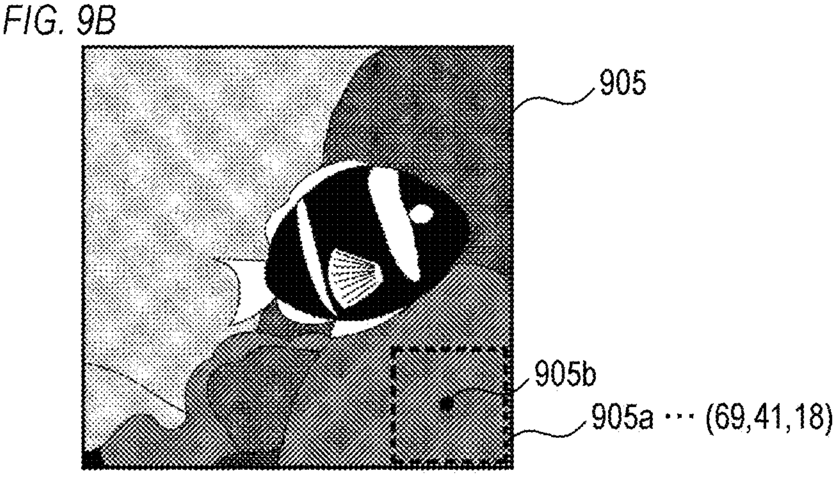
FIG. 9B is a diagram indicating a disposing region of a two-dimensional code.
Figure 9C:
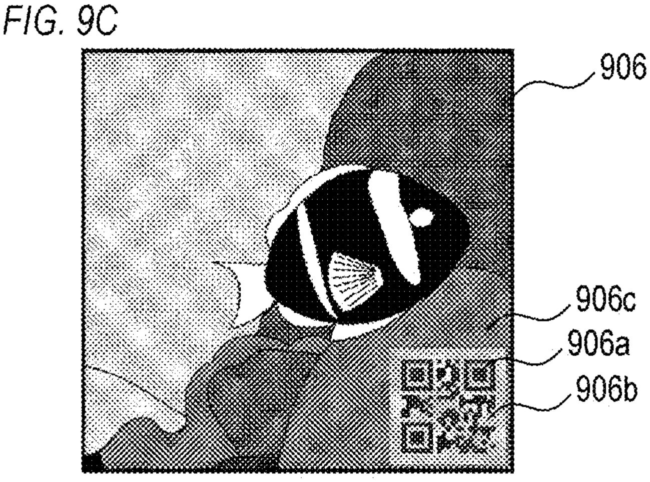
FIG. 9C is a diagram indicating a composite image.

Now an example in the case of using a different image will be described. FIG. 9A indicates an original image, FIG. 9B indicates a disposing region of the two-dimensional code, and FIG. 9C indicates an image after the two-dimensional code is combined. The Y value of the disposing region 701*a* in FIG. 7B is high, hence by using the average color of the entire disposing region 701*a* as the color of the base cell of the two-dimensional code, the two-dimensional code that can be clearly read can be obtained. However, the Y value of the disposing region 905*a* of the two-dimensional code that is set at the position 905*b* in the original image 905 is low. As indicated in FIG. 9B, the pixel values (RGB value (R value, G value, B value)) of the disposing region 905*a* are uniform (69, 41, 18), and the Y value calculated from the pixel values (69, 41, 18) is 45.2922, which is very low (dark). In this case, if the average color of the entire disposing region 905*a* is determined as a color of the base cell in S606 in FIG. 6, and a color darker than the base cell is determined as a color of the data cell in S607, the difference between the Y value of the data cell and the Y value of the base cell becomes less than 50. This means that the two-dimensional code that can be clearly read cannot be obtained.

In such a case, at least one of the colors of the base cell and the data cell is adjusted in S609. For example, a color, generated by increasing the Y value by 50 or more from the average color of the entire disposing region 905*a* without changing the hue, is redetermined as the color of the base cell. Then a color generated by decreasing the Y value by 50 or more from the redetermined color of the base cell without changing the hue, is redetermined as the color of the data cell. In the composite image 906 illustrated in FIG. 9C, the two-dimensional code (color two-dimensional code) is combined at the lower right corner (disposing region 905*a* of the two-dimensional code) of the original image 905. The color of the base cell 906*b* of the two-dimensional code is lighter than the color of the region 906*c* (peripheral region) around the disposing region 905*a* of the two-dimensional code, but the hue of the base cell 906*b* is the same as the hue of the peripheral region 906*c*. Further, the hue of the data cell 906*a* of the two-dimensional code is also the same as the hue of the peripheral region 906*c*. Hence in the composite image 906, the two-dimensional code is slightly lighter than the peripheral region 906*c*, but harmonizes well without a sense of incongruity. Moreover, the difference between the Y value of the data cell 906*a* and the Y value of the base cell 906*b* is 50 or more, therefore the two-dimensional code 804 can be clearly read.

The method for setting and adjusting the color of the base cell and the color of the data cell is not limited to the above method. For example, in the case where the Y value corresponding to the average value of the disposing region of the two-dimensional code is less than 50, this average value may be determined as the color of the data cell, and a color generated by increasing the Y value by 50 or more from the color of the data cell, without changing the hue, may be determined as the color of the base cell. Further, it may be selected whether this average color is determined as the color of the base cell, or determined as the color of the data cell, depending on the Y value corresponding to the average color of the disposing region of the two-dimensional code. For example, if the Y value corresponding to the average color of the disposing region of the two-dimensional code is less than 50, this average color may be determined as the color of the data cell, and if the Y value corresponding to the average color of the disposing region of the two-dimensional code is 50 or more, this average color may be determined as the color of the base cell.

Now a method for the user to specify the disposing region of the two-dimensional code and to confirm the composite image (image generated after the two-dimensional code is combined (drawn)) will be described with reference to FIGS. 10A to 10F. FIGS. 10A to 10F are diagrams indicating the operation procedure to determine the disposing region and color of the two-dimensional code.

Figures 10A, 10B, 10C, 10D, 10E, 10F:
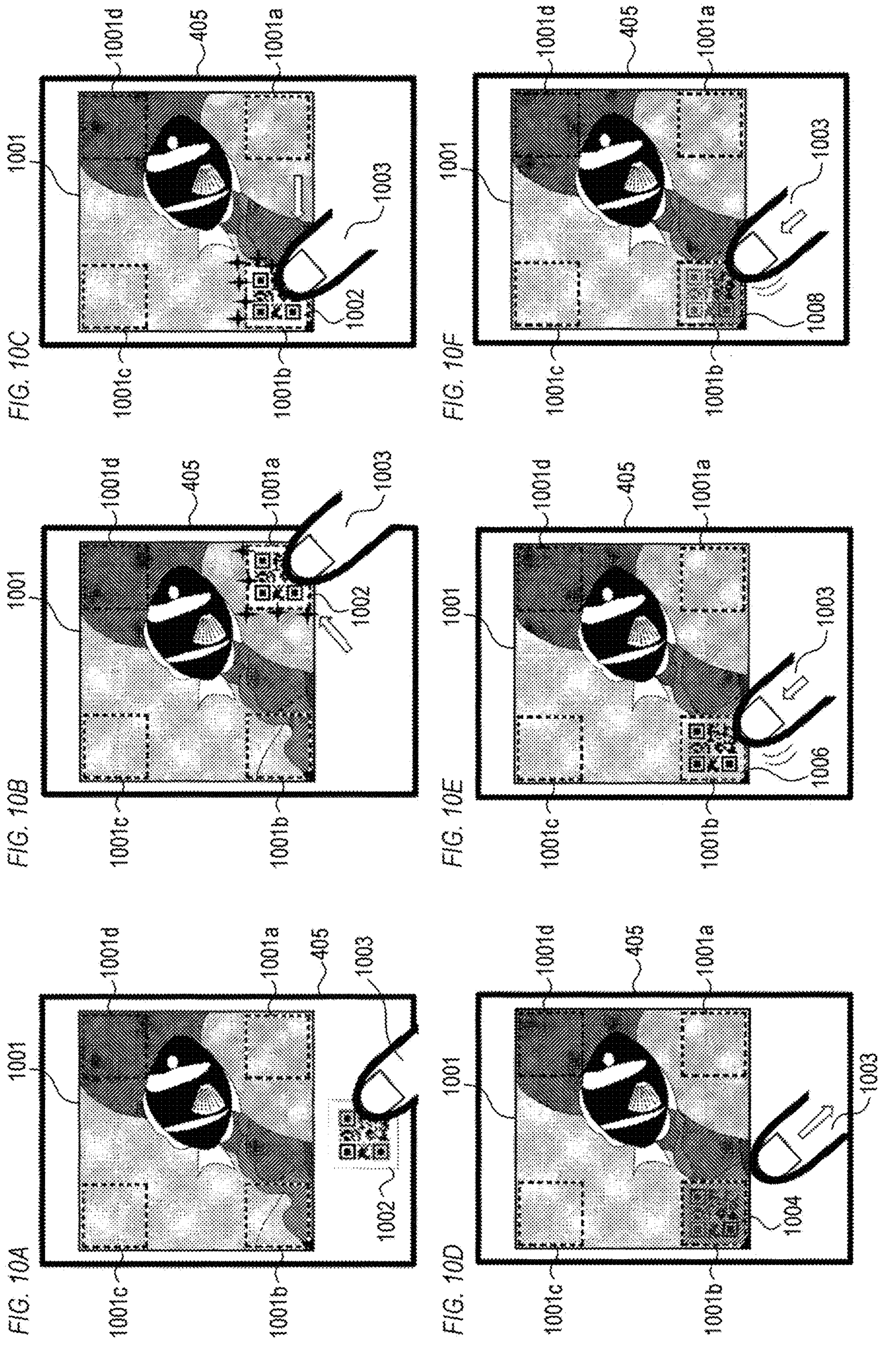
FIGS. 10A to 10F are diagrams indicating an operation procedure to determine a disposing region and a color of the two-dimensional code.

FIG. 10A indicates a state before the user specifies the disposing region of the two-dimensional code. In FIG. 10A, an original image 1001 disposed on the operation panel 405 is displayed, and a black and white two-dimensional code 1002 encoding the supplementary information selected or inputted by the user, is displayed outside of the original image 1001. The user touches the two-dimensional code 1002 with a finger 1003, and moves the touch position by a drag operation, whereby the two-dimensional code 1002 can be moved. In FIG. 10A, four candidates 1001*a*, 1001*b*, 1001*c* and 1001*d* of the disposing region of the two-dimensional code can be identified.

FIG. 10B indicates a state after the user moved the two-dimensional code 1002 to the position of the candidate 1001*a* (lower right corner of the original image 1001) by the drag operation. When the two-dimensional code 1002 is moved to the position of the candidate 1001*a*, the two-dimensional code 1002 blinks. Thereby the user can easily recognize that the two-dimensional code can be disposed at the current position (position of the candidate 1001*a*), for example.

FIG. 10C indicates a state after the user moved the two-dimensional code 1002 from the position of the candidate 1001*a* (lower right corner of the original image 1001) to the position of the candidate 1001*b* (lower left corner of the original image 1001) by the drag operation. When the two-dimensional code 1002 departs from the position of the candidate 1001*a*, the blinking of the two-dimensional code 1002 stops. Then when the two-dimensional code 1002 is moved to the position of the candidate 1001*b*, the two-dimensional code 1002 blinks. Thereby the user can easily recognize that the two-dimensional code can be disposed at the current position (position of the candidate 1001*b*), for example.

FIG. 10D indicates a state after the user ends the touch (drag operation) at the position of the candidate 1001*b* (lower left corner of the original image 1001). When the drag operation ends at the position of the candidate 1001*b*, blinking of the two-dimensional code 1002 stops, and the candidate 1001*b* is determined as the disposing region of the two-dimensional code. Then a color two-dimensional code 1004, having a color determined (set) by the first algorithm, is generated, and the currently displayed two-dimensional code changes from the two-dimensional code 1002 to the color two-dimensional code 1004. In the case of determining the disposing position of the two-dimensional code like this, a composite image is displayed and the user can confirm the composite image. In the state of FIG. 10D, a composite image corresponding to the first algorithm is displayed, and the user can confirm the composite image corresponding to the first algorithm. In the first algorithm, it is assumed that the average color of the disposing region of the two-dimensional code is determined as the color of the base cell of the two-dimensional code, and a color generated by decreasing the Y value by 50 or more from this average color, without changing the hue, is determined as the color of the data cell of the two-dimensional code. The first algorithm is suitably used in a case where the hue of the disposing region of the two-dimensional code is approximately uniform.

FIG. 10E indicates a state after a double tap (quickly touching twice) is performed on the color two-dimensional code 1004 in FIG. 10D. When a double tap is performed on the color two-dimensional code 1004, a color two-dimensional code 1006, having a color determined (set) by a second algorithm, is generated, and the currently displayed two-dimensional code changes from the color two-dimensional code 1004 to the color two-dimensional code 1006. In the second algorithm, it is assumed that a color having the highest Y value in the disposing region of the two-dimensional code is determined as the color of the base cell of the second dimensional code, and a color having the lowest Y value in the disposing region is determined as the color of the data cell of the two-dimensional code. The second algorithm is suitably used in a case where there are two major colors in the disposing region of the two-dimensional code, and the difference of the brightness or lightness between these two colors is large.

FIG. 10F indicates a state after a double tap is performed on the color two-dimensional code 1006 in FIG. 10E. When a double tap is performed on the color two-dimensional code 1006, a color two-dimensional code 1008, having a color determined (set) by a third algorithm, is generated, and the currently displayed two-dimensional code changes from the color two-dimensional code 1006 to the color two-dimensional code 1008. In the third algorithm, for each of a plurality of portions of the disposing region of the two-dimensional code, each color of the base cell and the data cell of the two-dimensional code is determined respectively, based on the color information corresponding to this portion. The third algorithm is suitably used in a case where colors of a plurality of portions in the disposing region of the two-dimensional code are significantly different.

For example, in the third algorithm, the disposing region of the two-dimensional code is divided into an upper half region (upper region) of the disposing region and a lower half region (lower region). Then the average color of the lower region is determined as the color of the base cell in the lower region, and a color generated by decreasing the Y value by 50 or more from this average value without changing the hue is determined as the color of the data cell in the lower region. In the same manner, the average color of the upper region is determined as the color of the base cell in the upper region, and a color generated by decreasing the Y value by 50 or more from this average value without changing the hue is determined as the color of the data cell in the upper region. Even in the case where a combination of the color of the base cell and the color of the data cell is different among a plurality of regions, the two-dimensional code can be clearly read if the contrast ratio between the base cell and the data cell within each region is sufficiently high.

In this way, an algorithm to determine a respective color of the base cell and the data cell of the two-dimensional code based on the color information may be selectable from a plurality of algorithms. Thereby a composite image, on which a more suitable two-dimensional code is disposed (e.g. composite image where the two-dimensional code harmonizes more), can be acquired. Further, a plurality of composite images, on which the two-dimensional code is drawn using a plurality of algorithms, may be displayed comparably. Then the user can easily select a composite image that better suits their preference.

A number of algorithms may be more or less than three. An algorithm may be automatically determined on the basis of the original image or the like, instead of the user selecting the algorithm. For this determination, an arithmetic unit obtained by machine learning may be used. Instead of switching among a plurality of composite images drawn by different algorithms, a plurality of composite images may be displayed side-by-side.

As described above, according to Embodiment 1, the color information on a region where the two-dimensional code is disposed in the original image is acquired, and the colors of the foreground and the background of the two-dimensional code are determined respectively on the basis of this color information. Thereby a two-dimensional code that can be clearly read and harmonizes with the image can be obtained.

In the example described above, the two-dimensional code is generated and combined by the portable terminal 400, but this processing may be performed by the printer 100. The image processing apparatus to which the present invention is applied may be a printer, or an apparatus separate from a printer. The colors of the foreground and the background of the two-dimensional code may be reversed. One of the colors of the foreground and the background of the two-dimensional code may be determined on the basis of the other color of the foreground and the background, or may not be determined on the basis of the other color.

Embodiment 2

Figure 11:
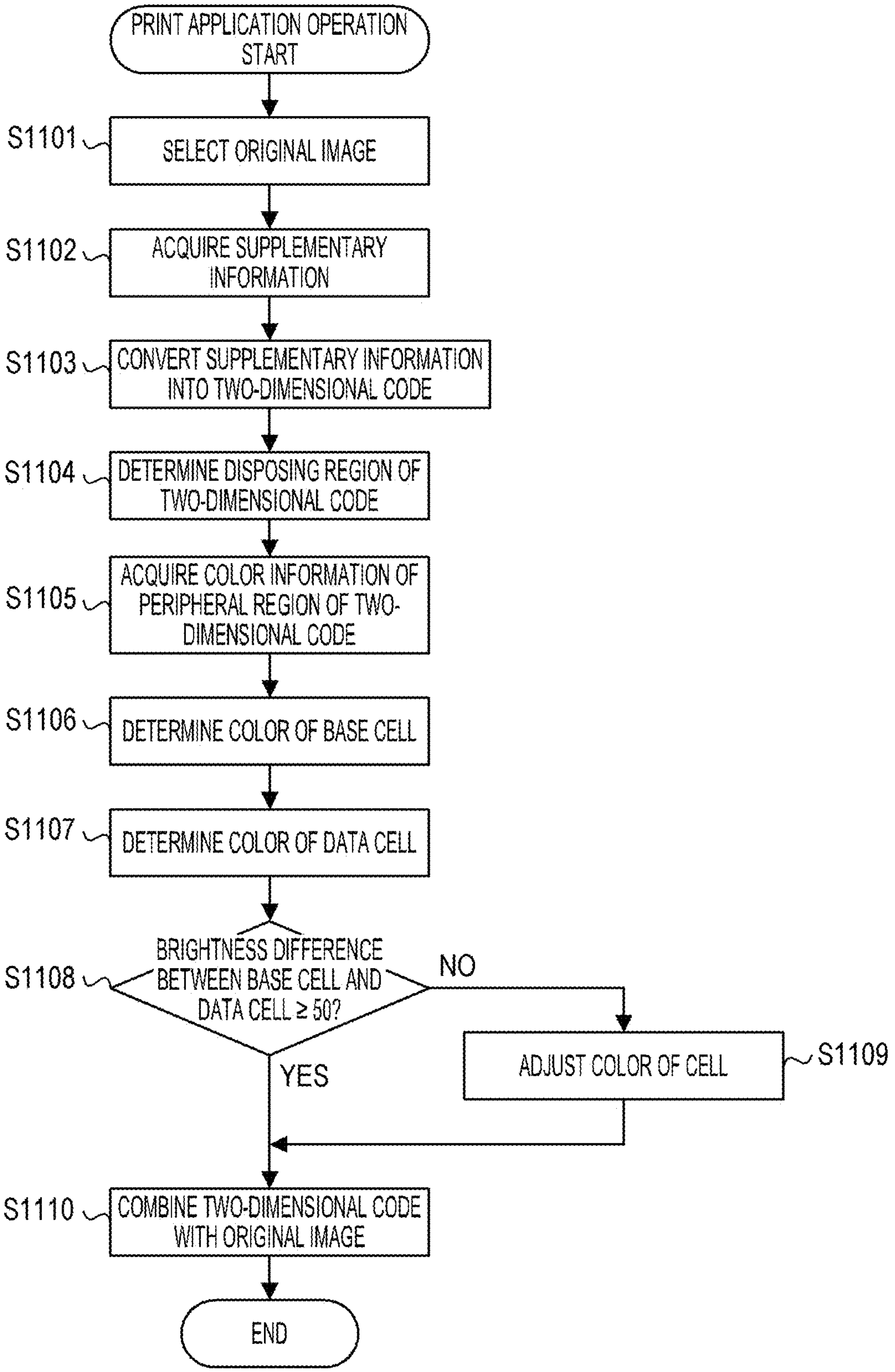
FIG. 11 is a flow chart of a print application operation according to Embodiment 2.

Embodiment 2 of the present invention will now be described with reference to FIG. 11. In the following, description on the same aspects as Embodiment 1 (e.g. same configuration and processing as Embodiment 1) will basically be omitted. FIG. 11 is a flow chart of a print application operation according to Embodiment 2. Here S1101 to S1104 are the same as S601 to S604 of Embodiment 1 (FIG. 6), and S1106 to S1110 are the same as S606 to S610 of Embodiment 1 (FIG. 6). In S605 of Embodiment 1 (FIG. 6), the CPU 401 acquires color information of the disposing region of the two-dimensional code. In S1105, on the other hand, the CPU 401 acquires color information of the region (peripheral region) around the disposing region of the two-dimensional code. By using the color information acquired like this, a color two-dimensional code having a color which harmonizes well with the color of the peripheral region can be acquired, and a composite image, without a sense of incongruity, can be obtained.

Embodiment 3

Figure 12:
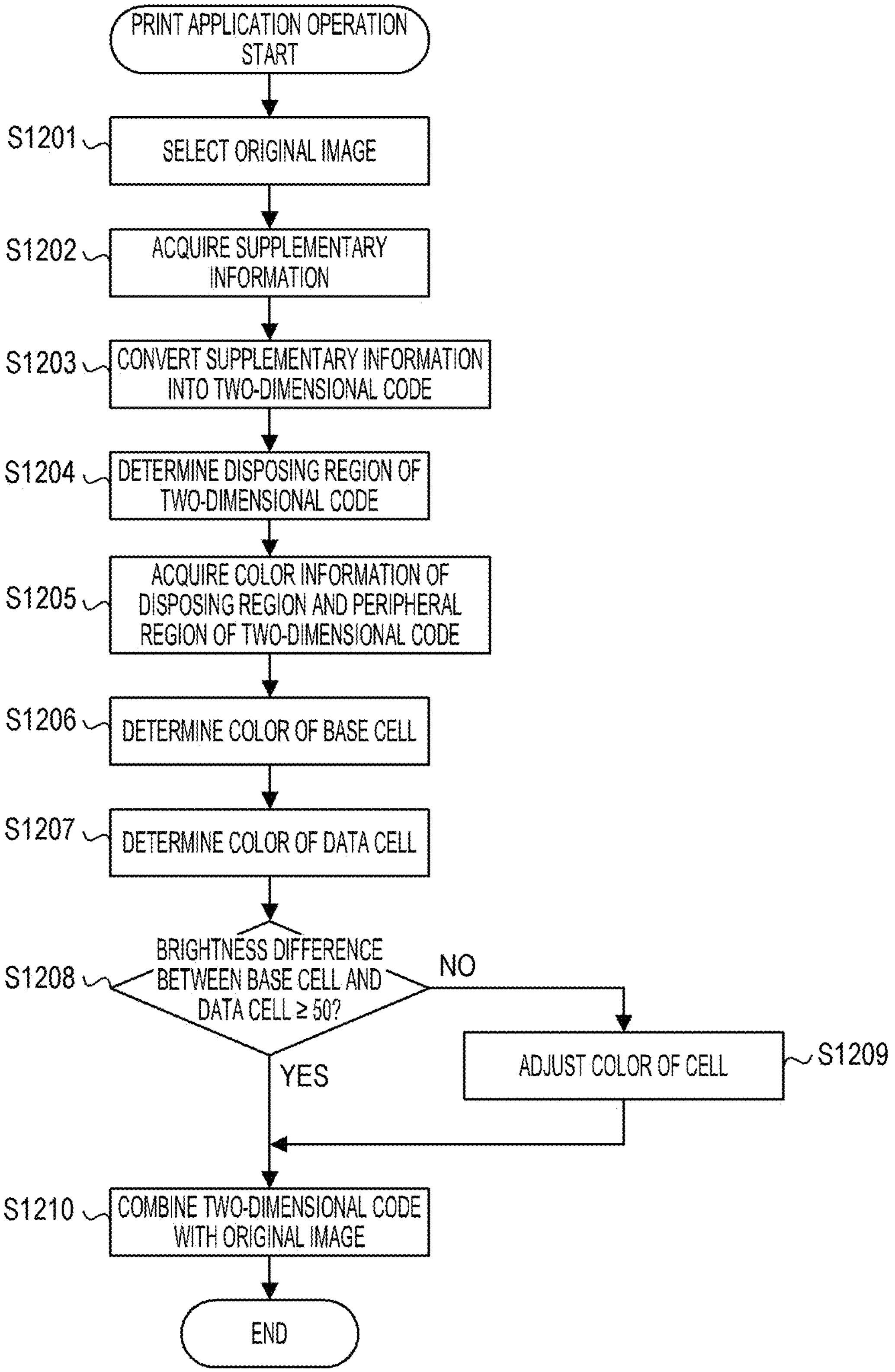
FIG. 12 is a flow chart of a print application operation according to Embodiment 3.

Embodiment 3 of the present invention will now be described with reference to FIG. 12. In the following description on the same aspects as Embodiment 1 (e.g. same configuration and processing as Embodiment 1) will basically be omitted. FIG. 12 is a flow chart of a print application operation according to Embodiment 3. Here S1201 to S1204 are the same as S601 to S604 of Embodiment 1 (FIG. 6), and S1206 to S1210 are the same as S606 to S610 of Embodiment 1 (FIG. 6). In S605 of Embodiment 1 (FIG. 6), the CPU 401 acquires color information of the disposing region of the two-dimensional code. In S1105 of Embodiment 2 (FIG. 11), the CPU 401 acquires color information of the region (peripheral region) around the disposing region of the two-dimensional code. In S1205, on the other hand, the CPU 401 acquires color information of a region combining the disposing region of the two-dimensional code and the peripheral region thereof. By using the color information acquired like this, a color two-dimensional code having a color which harmonizes well with the color of the peripheral region, and matches with the color of the disposing region, can be acquired, and a composite image without a sense of incongruity can be obtained.

As described in Embodiments 1 to 3, the region of which the color information is acquired can be changed as required, and by appropriately setting a region of which the color information is acquired, a composite image that betters suits the preference of the user can be obtained. The region of which the color information is acquired may be a predetermined fixed region, or may be a region specified by the user. Further, the region of which the color information is acquired may be automatically determined on the basis of the original image or the like. For this determination, an arithmetic unit obtained by machine learning may be used.

Embodiment 4

Embodiment 4 of the present invention will now be described with reference to FIGS. 13 and 14. In Embodiment 4, the color of the two-dimensional code is determined by the method of Embodiment 1, and the parameters of the coating processing (overcoat processing) that is performed during printing are determined. In the following, description on the same aspects as Embodiment 1 (e.g. same configuration and processing as Embodiment 1) will basically be omitted. The color of the two-dimensional code may be determined by the method of Embodiment 2, or may be determined by the method of Embodiment 3.

Figure 13:
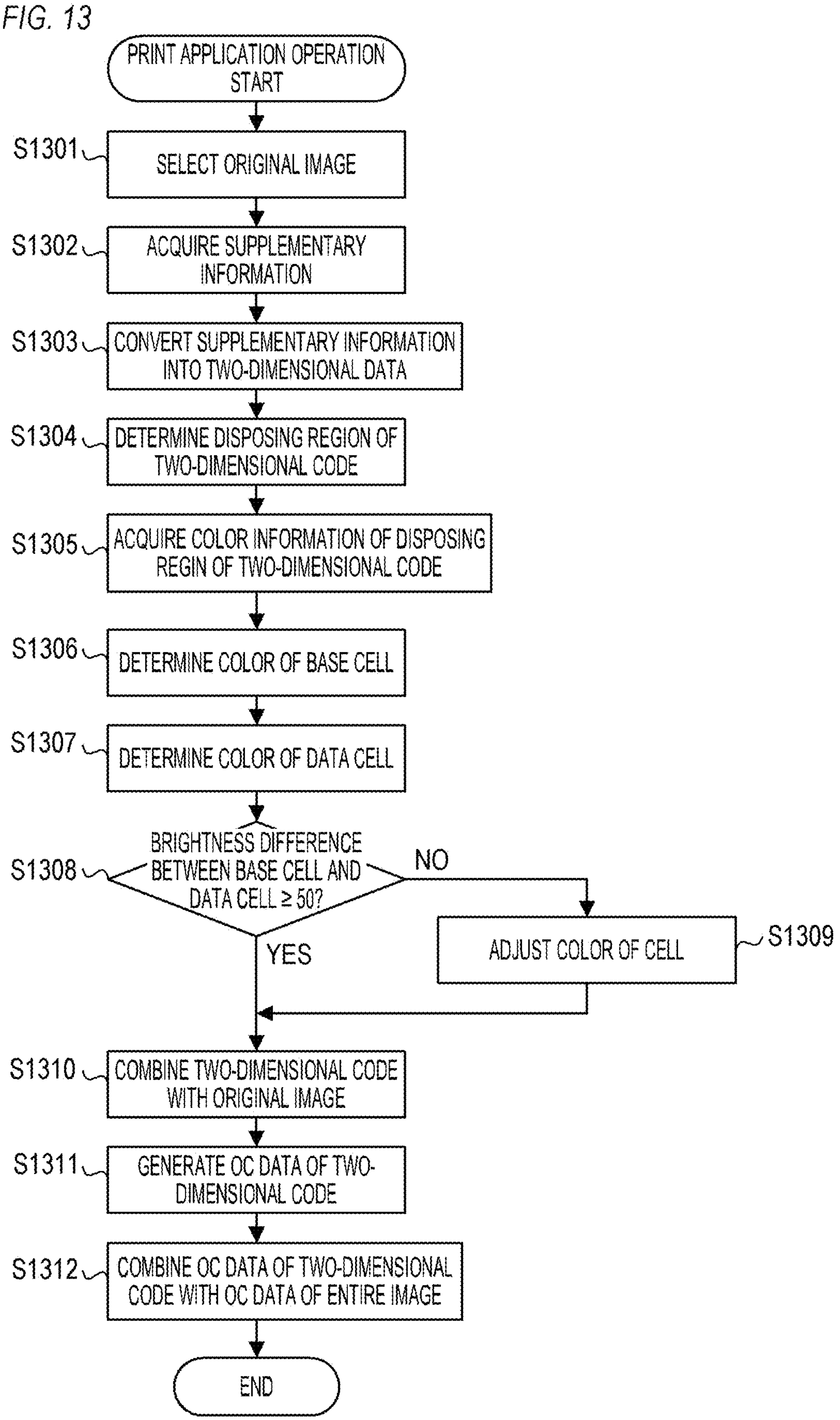
FIG. 13 is a flow chart of a print application operation according to Embodiment 4.

FIG. 13 is a flow chart of a print application operation according to Embodiment 4. Here S1301 to S1310 are the same as S601 to S610 of Embodiment 1 (FIG. 6).

In S1311, the CPU 401 generates parameters (OC data of the two-dimensional code) of the overcoat processing performed on the disposing region of the two-dimensional code. Here OC data, where the transfer gradation value of the data cell of the two-dimensional code is a low gloss value, and the transfer gradation value of the base cell of the two-dimensional code is a high gloss value, is generated. The low gloss transfer gradation value is a value at which high energy is supplied to the thermal head during the overcoat processing, and is a large value. In a low gloss portion when the large transfer gradation value is used, a surface becomes rough and optical scattering is generated thereby. The high gloss transfer gradation value is a value at which low energy is supplied to the thermal head during the overcoat processing, and is a small value. In a high gloss portion when the small transfer gradation value is used, the protective layer, which was melted and transferred, becomes virtually transparent.

In S1312, the CPU 401 combines the OC data of the two-dimensional code with the OC data of the entire image. The OC data of the entire image is OC data generated on the basis of the original image, for example. The data of the disposing region of the two-dimensional code, included in the OC data of the entire image, is overwritten by the OC data of the two-dimensional code. Thereby the OC data is generated such that a composite image, where the data cell of the two-dimensional code is low glass and the base cell of the two-dimensional code is high gloss, is printed.

Figure 14:
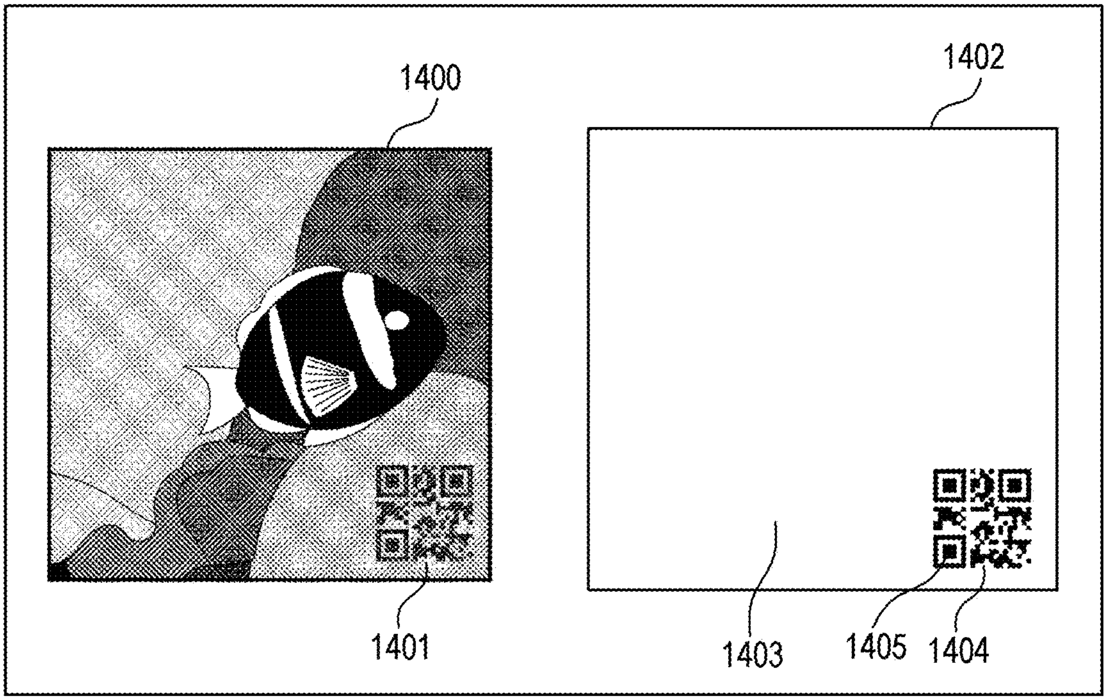
FIG. 14 is a diagram indicating a composite image and an overcoat.

FIG. 14 is a diagram indicating an example of the composite image and the overcoat (OC) according to Embodiment 4. A color two-dimensional code 1401 has been combined (drawn) on a composite image 1400. The composite image 1400 here is assumed to be generated by the same method as Embodiment 1. In an OC 1402, a high gloss transfer gradation value (small transfer gradation value) has been set for a region 1403 outside of the color two-dimensional code 1401. The high gloss transfer gradation value (small transfer gradation value) is set for a base sell 1404 of the color two-dimensional code 1401. For a data cell 1405 of the color two-dimensional code 1401, a low gloss transfer gradation value (large transfer gradation value) is set.

In the case of not performing the overcoat processing, the color two-dimensional code 1401 may be blended in with the composite image 1400 and obscured, and the user may not recognize the color two-dimensional code 1401. In Embodiment 4, the portion of the data cell 1405 is clearly seen by the optical scattering on the protective layer (rough surface) of the OC 1402, hence the user can more easily recognize the color two-dimensional code 1401. The OC 1402 is transparent, hence visibility of the composite image 1400 is not diminished by the OC 1402 very much.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

The embodiment described above (including variation examples) is merely an example. Any configurations obtained by suitably modifying or changing some configurations of the embodiment within the scope of the subject matter of the present invention are also included in the present invention. The present invention also includes other configurations obtained by suitably combining various features of the embodiment.

According to the present invention, a two-dimensional code, which can be clearly read and which harmonizes well with the image, can be obtained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-178225, filed on Oct. 16, 2023, which is hereby incorporated by reference herein in its entirety.

What is claimed is:

1. An image processing apparatus comprising:

a processor; and a memory storing a program which, when executed by the processor, causes the image processing apparatus to perform acquisition processing to acquire color information of at least one of a region in which a two-dimensional code is to be disposed and a peripheral region of the region on an image, perform determination processing to automatically determine a foreground color and a background color of the two-dimensional code based on the acquired color information, wherein one color is determined as each of the foreground color and the background color, and perform generation processing to generate a two-dimensional code image representing a two-dimensional code using the determined foreground color and the determined background color, and to generate a composite image by disposing the generated two-dimensional code image on the region of the image, wherein in the determination processing, based on the color information, each of the foreground color and the background color of the two-dimensional code is determined so that the foreground color and the background color have a same hue, and a difference between a value of brightness or lightness of the foreground color and a value of brightness or lightness of the background color becomes a threshold or more.

2. The image processing apparatus according to claim 1, wherein in the acquisition processing, the color information of the region in which the two-dimensional code is to be disposed is acquired.

3. The image processing apparatus according to claim 1, wherein in the acquisition processing, the color information of the peripheral region of the region in which the two-dimensional code is to be disposed is acquired.

4. The image processing apparatus according to claim 1, wherein in the acquisition processing, the color information of a region combining the region in which the two-dimensional code is to be disposed and the peripheral region of the region is acquired.

5. The image processing apparatus according to claim 1, wherein in the determination processing, based on the color information, an average color or a color having highest brightness or highest lightness is determined as the background color, and a color having a same hue as the determined background color and having reduced brightness or lightness is determined as the foreground color.

6. The image processing apparatus according to claim 1, wherein in the determination processing, at least one of the foreground color and the background color of the two-dimensional code is adjusted from a color in accordance with the color information, so that the difference between the value of brightness or lightness of the foreground color and the value of brightness or lightness of the background color becomes the threshold or more.

7. The image processing apparatus according to claim 1, wherein in a case where the value of brightness or lightness is represented by 256 bit, the threshold is 50 bit.

8. The image processing apparatus according to claim 1, wherein in the determination processing, it is capable of switching an algorithm to determine the foreground color and the background color of the two-dimensional code based on the color information, among a plurality of algorithms.

9. The image processing apparatus according to claim 1, wherein the program, when executed by the processor, further causes the image processing apparatus to perform control processing to control so as to display the composite image in which the two-dimensional code image is combined.

10. The image processing apparatus according to claim 9, wherein the program, when executed by the processor, further causes the image processing apparatus to perform setting processing to set the region, in which the two-dimensional code is to be disposed, in accordance with user operation, and in response to the region in which the two-dimensional code is to be disposed is set, in the control processing, it is controlled so as to display the composite image in which the two-dimensional code image is combined, wherein the two-dimensional code image is generated using the foreground color and the background color determined by the determination processing according to the set region.

11. The image processing apparatus according to claim 9, wherein in the drawing processing, it is capable of switching an algorithm to determine the foreground color and the background color of the two-dimensional code based on the color information, among a plurality of algorithms, and in the control processing, it is controlled so as to display a plurality of composite images in which the two-dimensional code is combined using the plurality of algorithms respectively for allowing comparison of the plurality of composite images.

12. The image processing apparatus according to claim 1, wherein in the acquisition processing, a plurality of color information corresponding to a plurality of portions of the image respectively are acquired, and in the determination processing, an average color of the plurality of portions is determined as one of the foreground color and the background color of the two-dimensional code, based on the plurality of color information, and a color, of which brightness or lightness is changed from brightness or lightness of the one of the foreground color and the background color, is determined as another one of the foreground color and the background color.

13. The image processing apparatus according to claim 1, wherein in the acquisition processing, a plurality of color information corresponding to a plurality of portions of the image respectively are acquired, and in the determination processing, a color of a portion of which brightness or lightness is highest or lowest among the plurality of portions, is determined as one of the foreground color and the background color of the two-dimensional code, based on the plurality of color information, and a color, of which brightness or lightness is changed from brightness or lightness of the one of the foreground color and the background color, is determined as another one of the foreground color and the background color.

14. The image processing apparatus according to claim 1, wherein in the acquisition processing, a plurality of color information are acquired, the plurality of color information corresponding to a plurality of portions of the region in which the two-dimensional code is to be disposed respectively, and in the determination processing, for each of the plurality of portions, the foreground color and the background color of the two-dimensional code are determined based on the color information corresponding to the portion.

15. The image processing apparatus according to claim 1, wherein the program, when executed by the processor, further causes the image processing apparatus to perform second determination processing to determine parameters of coating processing to be performed during printing, so as to print an image, of which a foreground of the two-dimensional code has low gloss and a background of the two-dimensional code has high gloss.

16. An image processing method comprising:

acquiring color information of at least one of a region in which a two-dimensional code is to be disposed and a peripheral region of the region on an image;

automatically determining a foreground color and a background color of the two-dimensional code based on the acquired color information, wherein one color is determined as each of the foreground color and the background color; and generating a two-dimensional code image representing a two-dimensional code using the determined foreground color and the determined background color, and to generate a composite image by disposing the generated two-dimensional code image on the region of the image, wherein based on the color information, each of the foreground color and the background color of the two-dimensional code is determined so that the foreground color and the background color have a same hue, and a difference between a value of brightness or lightness of the foreground color and a value of brightness or lightness of the background color becomes a threshold or more.

17. A non-transitory computer readable medium that stores a program, wherein the program causes a computer to execute an image processing method comprising:

acquiring color information of at least one of a region in which a two-dimensional code is to be disposed and a peripheral region of the region on an image;

automatically determining a foreground color and a background color of the two-dimensional code based on the acquired color information, wherein one color is determined as each of the foreground color and the background color; and generating a two-dimensional code image representing a two-dimensional code using the determined foreground color and the determined background color, and to generate a composite image by disposing the generated two-dimensional code image on the region of the image, wherein based on the color information, each of the foreground color and the background color of the two-dimensional code is determined so that the foreground color and the background color have a same hue, and a difference between a value of brightness or lightness of the foreground color and a value of brightness or lightness of the background color becomes a threshold or more.

* * * * *